US008488135B2

(12) United States Patent
Shimizu et al.

(10) Patent No.: US 8,488,135 B2
(45) Date of Patent: Jul. 16, 2013

(54) EASY MODIFICATION TO METHOD OF CONTROLLING APPLICATIONS IN IMAGE FORMING APPARATUS

(75) Inventors: Koji Shimizu, Fukuoka (JP); Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1242 days.

(21) Appl. No.: 11/372,073

(22) Filed: Mar. 10, 2006

(65) Prior Publication Data

US 2006/0215201 A1    Sep. 28, 2006

(30) Foreign Application Priority Data

| Mar. 14, 2005 | (JP) | 2005-071963 |
| Mar. 14, 2005 | (JP) | 2005-071964 |
| Feb. 21, 2006 | (JP) | 2006-044349 |
| Feb. 21, 2006 | (JP) | 2006-044350 |

(51) Int. Cl.
*G06F 3/12* (2006.01)
*G06K 15/00* (2006.01)

(52) U.S. Cl.
USPC ......... 358/1.13; 358/1.14; 358/1.16; 717/168

(58) Field of Classification Search
None
See application file for complete search history.

(56) References Cited

U.S. PATENT DOCUMENTS

| 2003/0036909 | A1* | 2/2003 | Kato .......................... 704/275 |
| 2004/0036904 | A1* | 2/2004 | Kimbara ..................... 358/1.14 |
| 2004/0057074 | A1 | 3/2004 | Ohishi et al. |
| 2004/0205261 | A1* | 10/2004 | Osada ............................. 710/8 |
| 2004/0218208 | A1* | 11/2004 | Akiyoshi et al. ............. 358/1.15 |
| 2004/0239973 | A1* | 12/2004 | Tanaka et al. ................ 358/1.13 |
| 2004/0239975 | A1* | 12/2004 | Kawaura et al. ............. 358/1.14 |
| 2005/0071648 | A1 | 3/2005 | Shimizu et al. |
| 2005/0071660 | A1 | 3/2005 | Shimizu et al. |
| 2005/0105135 | A1* | 5/2005 | Takahashi .................... 358/1.18 |
| 2005/0179961 | A1* | 8/2005 | Czyszczewski et al. ...... 358/468 |
| 2005/0226641 | A1* | 10/2005 | Ando et al. ...................... 399/8 |
| 2006/0123345 | A1* | 6/2006 | Parimi ......................... 715/746 |

FOREIGN PATENT DOCUMENTS

| JP | 07-036831 | 2/1995 |
| JP | 2000-99348 | 4/2000 |
| JP | 2001-166943 | 6/2001 |
| JP | 2001-312398 | 11/2001 |
| JP | 2002-84383 | 3/2002 |
| JP | 2003-337704 | 11/2003 |
| JP | 2004-110779 | 4/2004 |
| JP | 2004-122773 A | 4/2004 |
| JP | 2004-127280 | 4/2004 |
| JP | 2004-297792 | 10/2004 |
| JP | 2004-318842 A | 11/2004 |
| JP | 2006-86642 | 3/2006 |

OTHER PUBLICATIONS

Office Action mailed Jan. 29, 2013 in Japanese Patent Application No. 2011-179321.

* cited by examiner

*Primary Examiner* — Marivelisse Santiago Cordero
*Assistant Examiner* — Huo Long Chen
(74) *Attorney, Agent, or Firm* — Oblon, Spivak, McClelland, Maier & Neustadt, L.L.P.

(57) ABSTRACT

An image forming apparatus configured to run a plurality of applications having different activation conditions includes an item acquiring unit configured to acquire from an item storage an item to be displayed on a setting screen for making a setting to an application, and a screen providing unit configured to generate and display the setting screen in response to the item acquired by the item acquiring unit, wherein the screen providing unit generates the setting screen in response to an item acquired from a file that contains one or more items that are unique for each application activation condition.

15 Claims, 41 Drawing Sheets

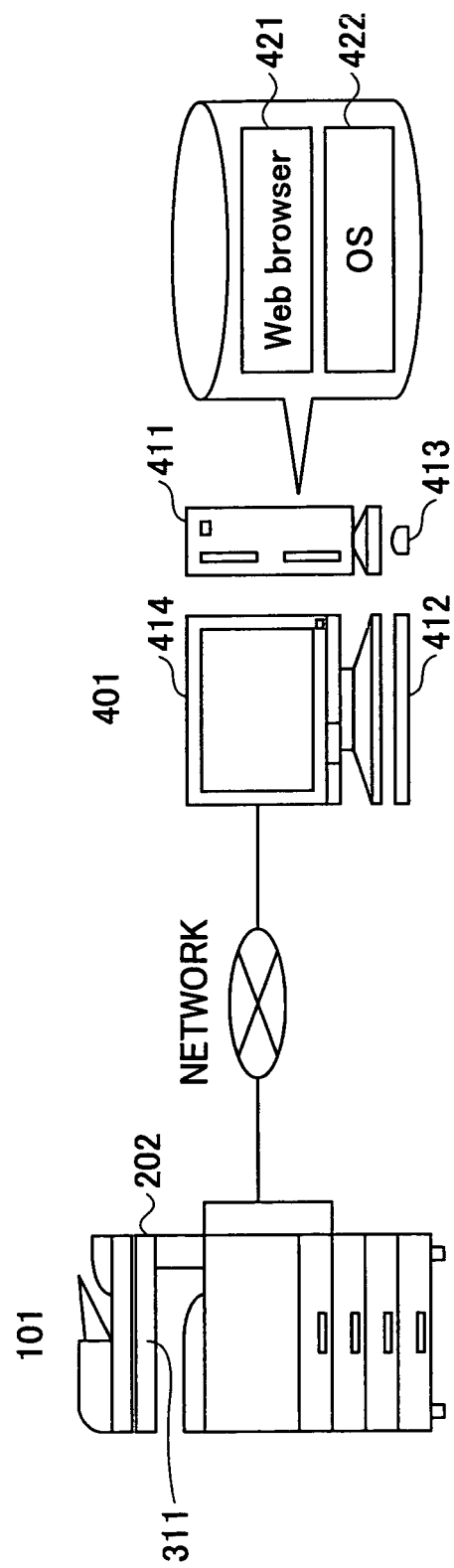

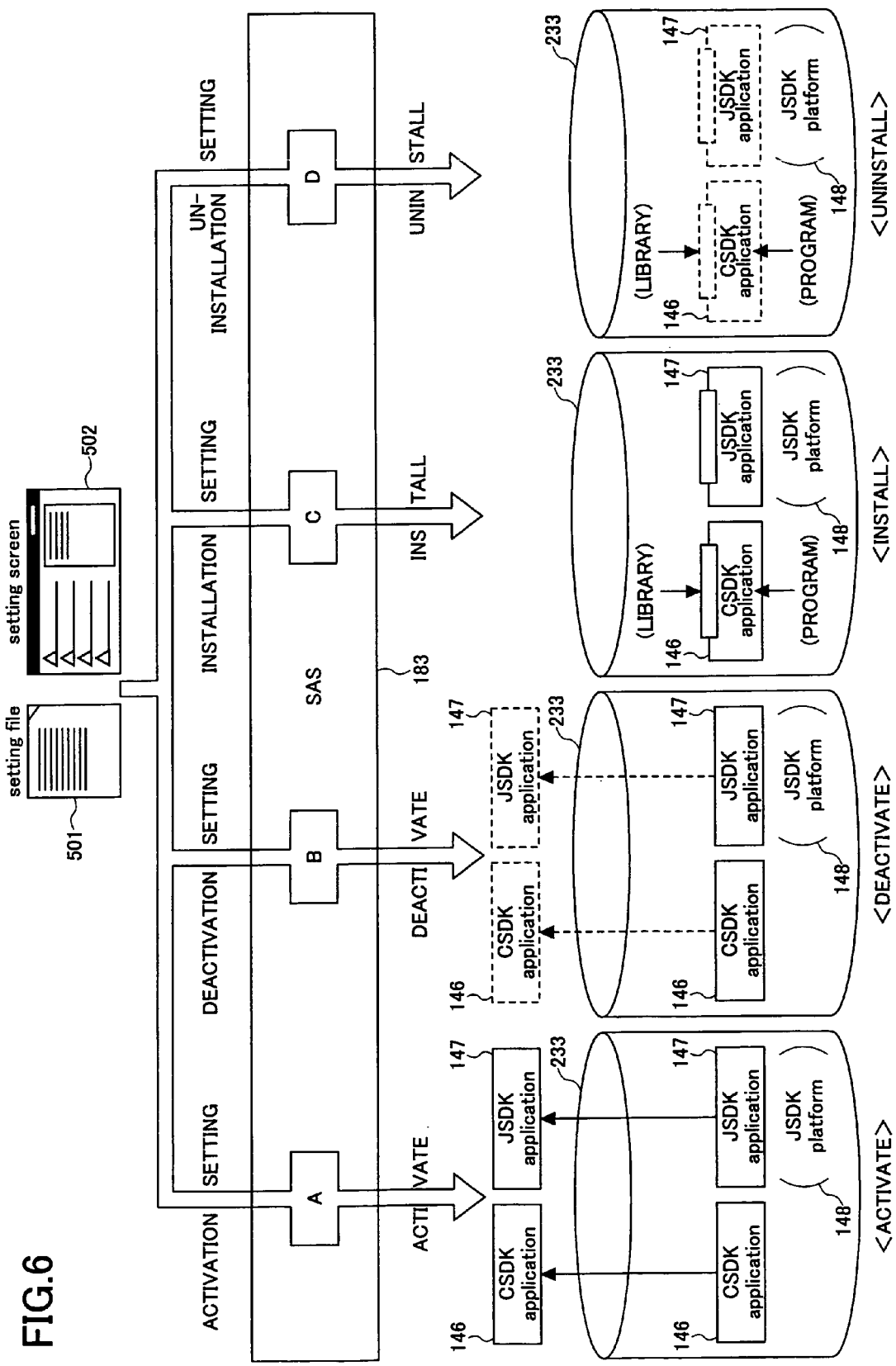

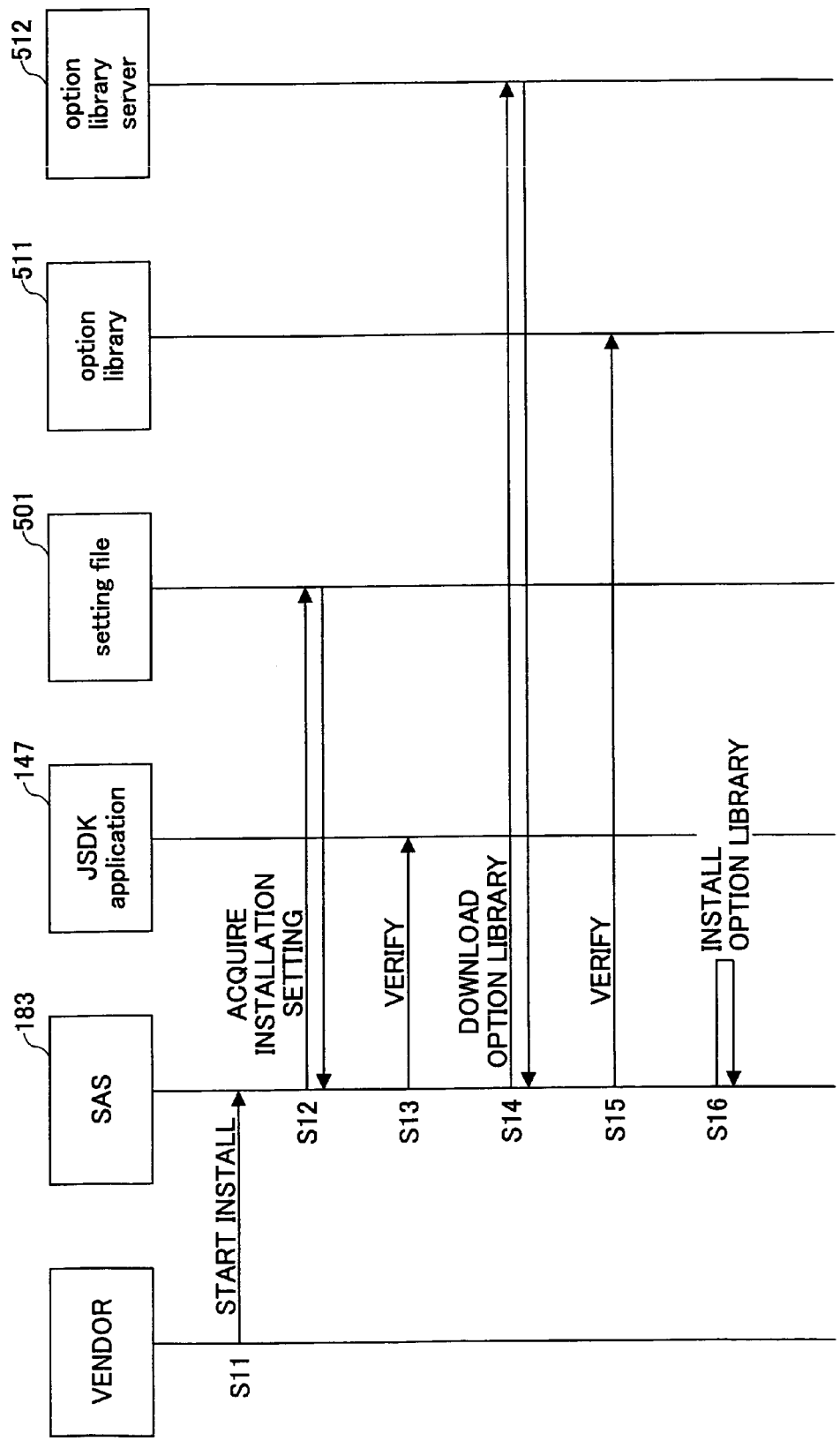

FIG.8A

EXAMPLE 1
```
           A         B              C                    D
        <resources>
        <option-library version="1.3" dest="apli" href="http://XXX.XXX.com/jsdk/option/option.jar" />
        </resources>
```

FIG.8B

EXAMPLE 2
```
           A         B                 C                   D
        <resources>
        <option-library version="latest" dest="sys" href="http://XXX.XXX.com/jsdk/option/option.jar" />
        </resources>
```

FIG.8C

EXAMPLE 3
```
           A         B                    C                  D
        <resources>
        <option-library version="selectable" dest="sys" href="http://XXX.XXX.com/jsdk/option/option.jar" />
          <information>
          <exp-date>2010/12/31</exp-date>          ⎫
          </information>                            ⎬ E
        </resources>
```

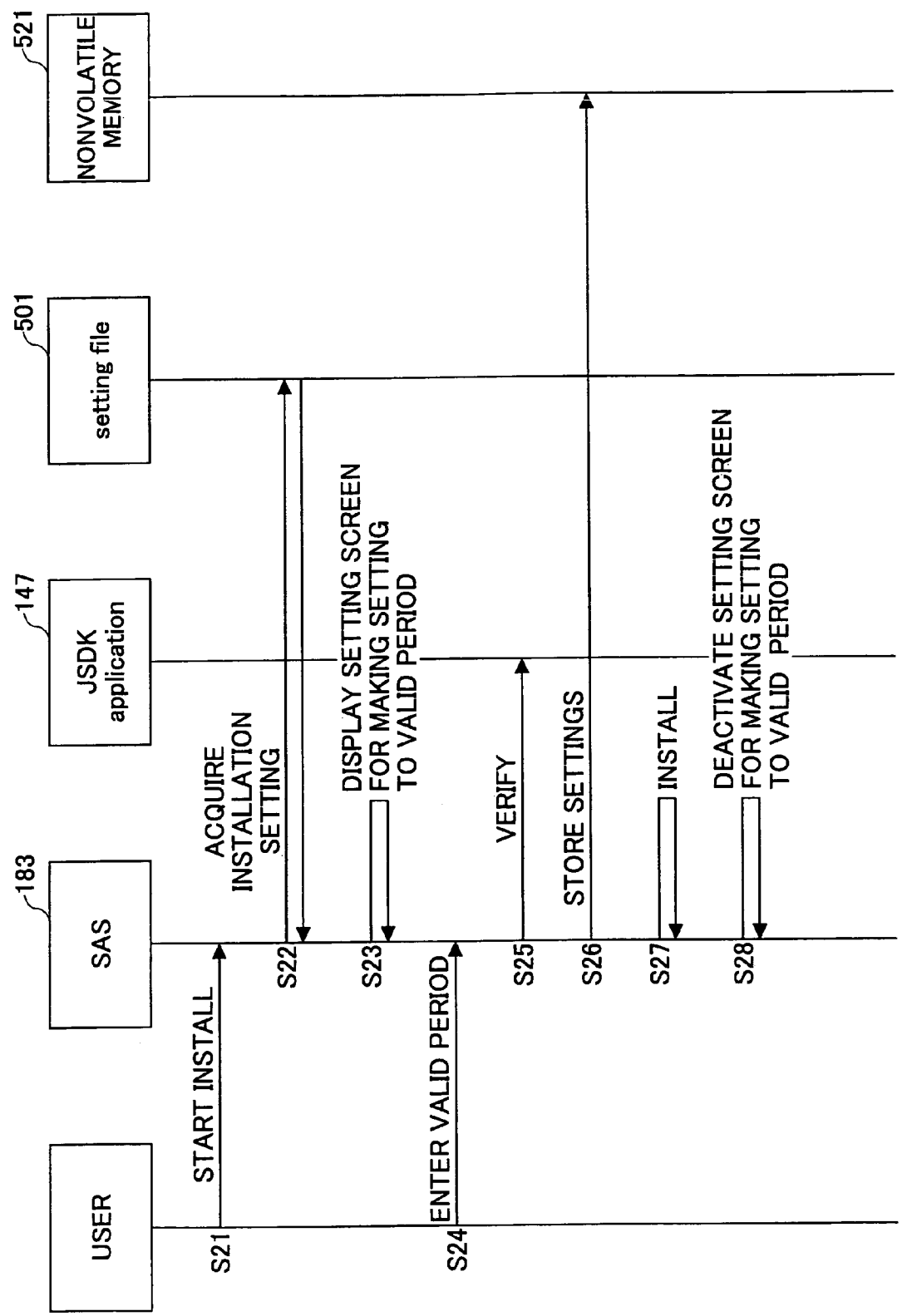

FIG.10

APPLICATION INITIAL SETTING — 502A

ACTIVATE | INSTALL | UNINSTALL | END

ENTER EXPIRATION DATE

2010/12/31

ENTER

OK | CANCEL

| APPLICATION NAME | DESCRIPTION | VERSION |
|---|---|---|
| APPLICATION 1 | DESCRIPTION OF APPLICATION 1 | 1.00 |
| APPLICATION 2 | DESCRIPTION OF APPLICATION 2 | 1.00 |
| APPLICATION 3 | DESCRIPTION OF APPLICATION 3 | 1.00 |
| APPLICATION 4 | DESCRIPTION OF APPLICATION 4 | 1.00 |

| APPLICATION INITIAL SETTING | | | | | | END |
|---|---|---|---|---|---|---|
| ACTIVATE | INSTALL | UNINSTALL | CHANGE ASSIGNMENT | APPLICATION INFORMATION | SETTING FOR ADMINISTRATOR | |

502

RETURN

↑

| APPLICATION NAME | DESCRIPTION | VERSION | SOURCE OF ACTIVATION |
|---|---|---|---|
| APPLICATION 1 | DESCRIPTION OF APPLICATION 1 | 1.00 | SD CARD SLOT 1 |
| APPLICATION 2 | DESCRIPTION OF APPLICATION 2 | 1.00 | SD CARD SLOT 1 |
| APPLICATION 3 | DESCRIPTION OF APPLICATION 3 | 1.00 | SD CARD SLOT 1 |

▲PREVIOUS
▼NEXT

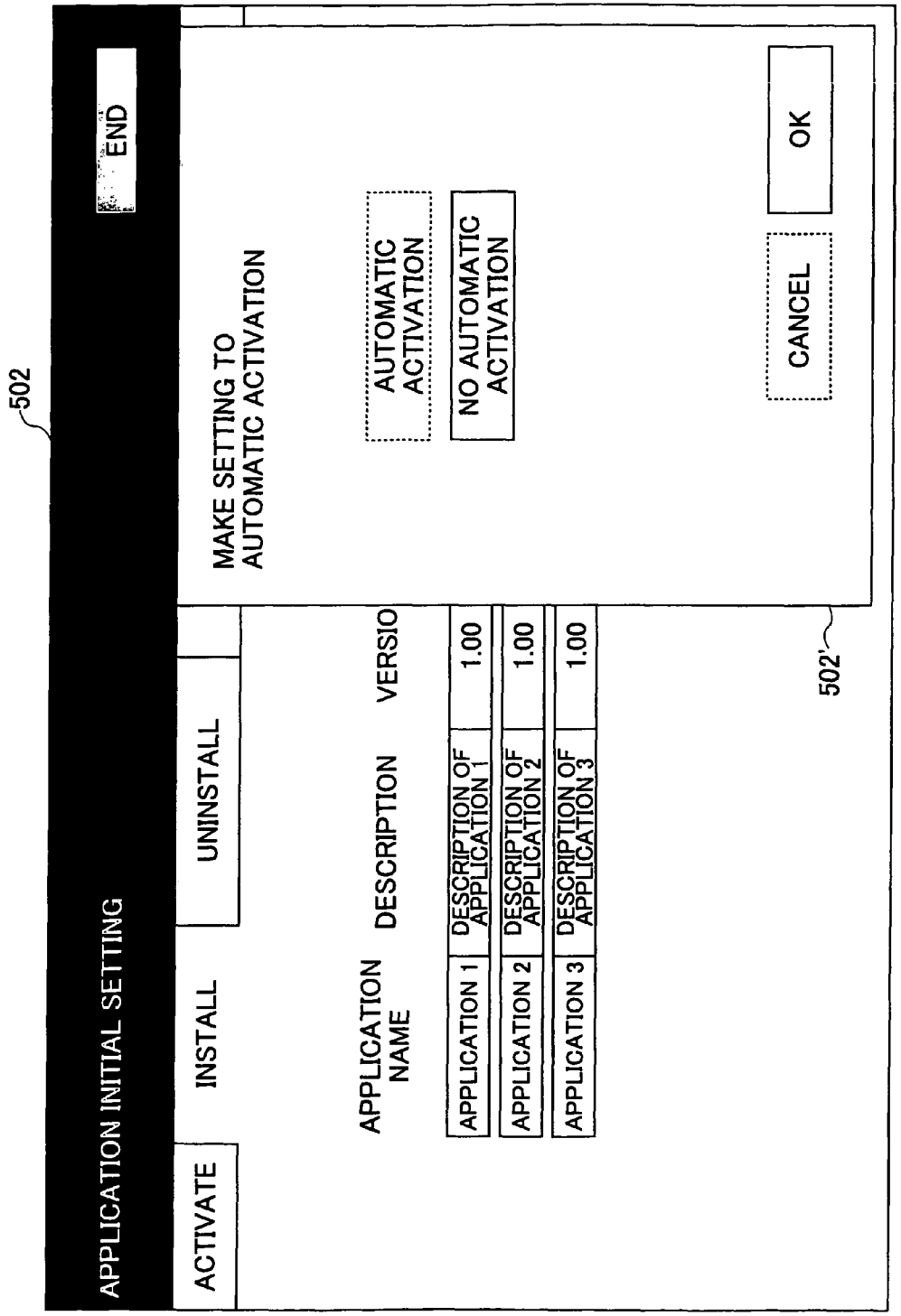

FIG.12

| APPLICATION INITIAL SETTING | | | | | | END |
|---|---|---|---|---|---|---|
| ACTIVATE | INSTALL | UNINSTALL | CHANGE ASSIGNMENT | APPLICATION INFORMATION | SETTING FOR ADMINISTRATOR | |

502

RETURN

↑

| STATUS | APPLICATION NAME | DESCRIPTION | VERSION | SOURCE OF ACTIVATION |
|---|---|---|---|---|
| ACTIVATED | APPLICATION 1 | DESCRIPTION OF APPLICATION 1 | 1.00 | SD CARD SLOT 1 |
| ACTIVATED | APPLICATION 2 | DESCRIPTION OF APPLICATION 2 | 1.00 | SD CARD SLOT 1 |
| STOPPED | APPLICATION 3 | DESCRIPTION OF APPLICATION 3 | 1.00 | SD CARD SLOT 1 |

▲PREVIOUS

▼NEXT

FIG.13

APPLICATION INITIAL SETTING — 502

| ACTIVATE | INSTALL | UNINSTALL | CHANGE ASSIGNMENT | APPLICATION INFORMATION | SETTING FOR ADMINISTRATOR | END |

| STATUS | APPLICATION NAME | DESCRIPTION | VERSION | SOURCE OF ACTIVATION | |
|---|---|---|---|---|---|
| ACTIVATED | APPLICATION 1 | DESCRIPTION OF APPLICATION 1 | 1.00 | SD CARD SLOT 1 | GIVEN PRIORITY |
| ACTIVATED | APPLICATION 2 | DESCRIPTION OF APPLICATION 2 | 1.00 | SD CARD SLOT 1 | GIVEN PRIORITY |
| STOPPED | APPLICATION 3 | DESCRIPTION OF APPLICATION 3 | 1.00 | SD CARD SLOT 1 | GIVEN PRIORITY |

RETURN

▲ PREVIOUS
▼ NEXT

FIG.23

```
<?xml version="1.0" encoding="utf-8"?>
<apli_item>
<node num="1">
    <name>
        <res>start_limitcount</res>
    </name>
    <value mode="selectbox">
        <select_item>0</select_item>
        <select_item>10</select_item>
        <select_item>20</select_item>
        <select_item>30</select_item>
    </value>
</type>
</node>
<node num="2">
    <name>
        <res>print_limitcount</res>
    </name>
    <value mode="selectbox">
        <select_item>0</select_item>
        <select_item>100</select_item>
        <select_item>200</select_item>
        <select_item>300</select_item>
    </value>
</type>
</node>
```

21A — first node block
21B — second node block

FIG.24

```
<?xml version="1.0" encoding="utf-8"?>
<type_item id="1">
    <node num="1">
        <name>
            <res>functionkey_select</res>
        </name>
        <value mode="selectbox">
            <select_item>
                <res>COPY</res>
            </select_item>
            <select_item>
                <res>SCANNER</res>
            </select_item>
            <select_item>
                <res>FAX</res>
            </select_item>
        </type>
    </node>
</type_item>
```

```
<?xml version="1.0" encoding="utf-8"?>
<type_item id="2">
    <node num="1">
        <name>
            <res>autostart_setting</res>
        </name>
        <value mode="radiobutton">
            <select_item>
                <res>yes</res>
            </select_item>
            <select_item>
                <res>no</res>
            </select_item>
        </value>                                    ⎬ 23A
    </node>
</type_item>
```

FIG.26

```
<?xml version="1.0" encoding="utf-8"?>
<basic_item>
        <node num="1">
                <name>
                        <res>product_id</res>
                </name>
                <value mode="label">11111111</value>
        </node>                                              — 24A
        <node num="2">
                <name>
                        <res>apli_name</res>
                </name>
                <value mode="label">App1</value>
        </node>                                              — 24B
        <node num="3">
                <name>
                        <res>install_origin</res>
                </name>
                <value mode="label">SD3</value>
        </node>                                              — 24C
        <node num="4">
                <name>
                        <res>install_destination</res>
                </name>
                <value mode="selectbox">
                        <select_item>SD0</select_item>
                        <select_item>SD1</select_item>
                        <select_item>SD2</select_item>
                        <select_item>HDD</select_item>
                </type>
        </node>                                              — 24D
</basic_item>
```

FIG.27

```xml
<?xml version="1.0" encoding="ja_JP.SJIS"?>
<resource lang="ja">

<item id="product_id">プロダクトID</item>         ⎫
    <item id="apli_name">アプリ名称</item>             ⎬ 25C
    <item id="install_origin">インストール元</item>
    <item id="install_destination">インストール先</item>⎭

<item id="functionkey_select">機能キー割当先</item>⎫
    <item id="COPY">コピー</item>                      ⎪
    <item id="SCANNER">スキャナー</item>               ⎬ 25B
    <item id="FAX">ファックス</item>                   ⎪
    <item id="yes">はい</item>                         ⎪
    <item id="no">いいえ</item>                        ⎭

<item id="start_limitcount">起動可能回数</item>    ⎫ 25A
    <item id="print_limitcount">印刷可能枚数</item>    ⎭

</resource>
```

FIG.28

```xml
<?xml version="1.0" encoding="utf-8"?>
<resource lang="en">
    <item id="product_id">Product ID</item>
    <item id="apli_name">Application Name</item>
    <item id="install_origin">install origin</item>
    <item id="install_destination">install destination</item>
    <item id="functionkey_select">Assign functionkey</item>
    <item id="COPY">COPY</item>
    <item id="SCANNER">SCANNER</item>
    <item id="FAX">FAX</item>
    <item id="yes">yes</item>
    <item id="no">no</item>
    <item id="start_limitcount">Limit of start</item>
    <item id="print_limitcount">Limit of print</item>
</resource>
```

26C braces: product_id, apli_name, install_origin, install_destination 26B braces: functionkey_select, COPY, SCANNER, FAX, yes, no 26A braces: start_limitcount, print_limitcount

```
<?xml version="1.0" encoding="ja_JP.SJIS"?>
<resource lang="ja">
    <item id="title">WebImageMonitor</item>
    <item id="machine_name">ImagioNeo</item>
    <item id="ext_setting_top">アプリケーション初期設定</item>
    <item id="start">起動</item>
    <item id="install_apli">インストール</item>
    <item id="uninstall_apli">アンインストール</item>
    <item id="apli_information">アプリ情報</item>
    <item id="product_id">プロダクトID</item>
    <item id="apli_name">アプリ名称</item>
    <item id="install_origin">インストール元</item>
    <item id="install_destination">インストール先</item>
    <item id="functionkey_select">機能キー割当当先</item>
    <item id="COPY">コピー</item>
    <item id="SCANNER">スキャナー</item>
    <item id="FAX">ファックス</item>
    <item id="yes">はい</item>
    <item id="no">いいえ</item>
    <item id="start_limitcount">起動可能回数</item>
    <item id="print_limitcount">印刷可能枚数</item>
</resource>
```

```
<?xml version="1.0" encoding="utf-8"?>
<resource lang="en">
    <item id="title">WebImageMonitor</item>
    <item id="machine_name">ImagioNeo</item>
    <item id="top">Application Initial Setting</item>
    <item id="start">Application Start</item>
    <item id="install_apli">Application Install</item>
    <item id="uninstall_apli">Application Uninstall</item>
    <item id="apli_information">Application Information</item>
    <item id="product_id">Product ID</item>
    <item id="apli_name">Application Name</item>
    <item id="install_origin">install origin</item>
    <item id="install_destination">install destination</item>
    <item id="functionkey_select">Assign Functionkey</item>
    <item id="COPY">COPY</item>
    <item id="SCANNER">SCANNER</item>
    <item id="FAX">FAX</item>
    <item id="yes">yes</item>
    <item id="no">no</item>
    <item id="start_limitcount">Limit of start</item>
    <item id="print_limitcount">Limit of print</item>
</resource>
```

33D: title, machine_name
33E: install_apli, uninstall_apli, apli_information
33C: product_id, apli_name, install_origin, install_destination
33B: functionkey_select, COPY, SCANNER, FAX, yes, no
33A: start_limitcount, print_limitcount

FIG.37

```
<?xml version="1.0" encoding="utf-8"?>
<header_item>
    <node num="1">
        <name>
            <res>title</res>
        </name>
    </node>
    <node num="2">
        <name>
            <res>machine_type</res>
        </name>
    </node>
</header_item>
```

FIG.38

```xml
<?xml version="1.0" encoding="utf-8"?>
<menu_item>
        <node num="1">
                <name>
                        <res>top</res>
                </name>
                <node num="2">
                        <name>
                                <res>start</res>
                        </name>
                </node>
                <node num="3">
                        <name>
                                <res>install_apli</res>
                        </name>
                </node>
                <node num="4">
                        <name>
                                <res>uninstall_apli</res>
                        </name>
                </node>
                <node num="5">
                        <name>
                                <res>apli_information</res>
                        </name>
                </node>
        </node>
</menu_item>
```

EASY MODIFICATION TO METHOD OF CONTROLLING APPLICATIONS IN IMAGE FORMING APPARATUS

BACKGROUND OF THE INVENTION

1. Field of the Invention

The present invention relates to an image forming apparatus such as a copier, printer, scanner, facsimile machine, compound machine, multifunctional machine, or the like, an information processing method, a program, and a memory medium such as an SD memory card.

2. Description of the Related Art

In recent years, compound machines and multifunctional machines provided with all of the copier function, printer function, and scanner function have begun to be commercially available on the market. A compound machine or multifunctional machine prints an image on a print sheet when it functions as a copier or printer, and scans an image from an original document when it serves as a copier or scanner. Also, the compound machine or multifunctional machine exchanges images with another device via a telephone line when it serves as a facsimile machine.

Patent Document 1 discloses an invention directed to an image forming apparatus provided with all of the copier function, printer function, and scanner function. In this image forming apparatus, software corresponding to applications and software corresponding to a platform are provided as software components of the image forming apparatus. Patent Document 2 and Patent Document 3 disclose inventions directed to an image forming apparatus provided with various types of software components.

[Patent Document 1] Japanese Patent Application Publication No. 2002-84383

[Patent Document 2] Japanese Patent Application Publication No. 2004-110779

[Patent Document 3] Japanese Patent Application Publication No. 2004-297792

With respect to the usage of compound machines and multifunctional machines, various types of needs are in existence on the market. In order to satisfy those various types of needs, it may suffice to change the design of applications for use in the compound machines and multifunctional machines according to where these machines are used. In practice, however, changing application designs according to the place of use is rather difficult. It may thus be convenient if the method of controlling applications can be changed according to the place of use, instead of changing application designs according to the place of use.

Accordingly, there is a need for an image forming apparatus for which the method of controlling applications for use in the image forming apparatus can be readily modified according to the place of use. Also, there are needs for an information processing method, a program, and a record medium for use with such image forming apparatus.

SUMMARY OF THE INVENTION

It is a general object of the present invention to provide an image forming apparatus, an information processing method, a program, and a record medium that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image forming apparatus, an information processing method, a program, and a record medium particularly pointed out in the specification in such full, clear, concise, and exact terms as to enable a person having ordinary skill in the art to practice the invention.

To achieve these and other advantages in accordance with the purpose of the invention, the invention provides an image forming apparatus configured to run a plurality of applications having different activation conditions, which includes an item acquiring unit configured to acquire from an item storage an item to be displayed on a setting screen for making a setting to an application, and a screen providing unit configured to generate and display the setting screen in response to the item acquired by the item acquiring unit, wherein the screen providing unit generates the setting screen in response to an item acquired from a file that contains one or more items that are unique for each application activation condition.

According to another aspect of the present invention, an image forming apparatus configured to run a plurality of applications having different activation conditions includes an item acquiring unit configured to acquire from an item storage an item to be displayed on a setting screen for making a setting to an application, and an item providing unit configured to provide the item acquired by the item acquiring unit to a screen providing unit that generates and displays the setting screen in response to the item, wherein the item providing unit provides an item, acquired from a file that contains one or more items that are unique for each application activation condition, to the screen providing unit that generates and displays the setting screen in response to the provided item.

According to another aspect of the present invention, an image forming apparatus includes an application controlling unit configured to install a plurality of applications in a unified manner and to control the applications, wherein the application controlling unit is configured to acquire activation conditions of the applications from a setting file recorded on a recording medium to control activations of the applications in response to the activation conditions.

According to another aspect of the present invention, an image forming apparatus includes an application controlling unit configured to install a plurality of applications in a unified manner and to control the applications, wherein the application controlling unit is configured to acquire install conditions of the applications from a setting file recorded on a recording medium to control installation or uninstallation of the applications in response to the install conditions.

In the image forming apparatus as described above, the method of controlling applications for use in this image forming apparatus can be readily changed according to where this image forming apparatus is used.

Further, in order to achieve the above objectives, the present invention may provide an information processing method used in the image forming apparatus described above, a program for causing a computer to perform the information processing method, and/or a record medium having such program embodied therein.

According to at least one embodiment of the present invention, it is possible to provide an image forming apparatus, an information processing method, a program, and a record medium for which the method of controlling applications for use in the image forming apparatus can be readily modified according to the place of use of the image forming apparatus.

BRIEF DESCRIPTION OF THE DRAWINGS

Other objects and further features of the present invention will be apparent from the following detailed description when read in conjunction with the accompanying drawings, in which:

FIG. 5 is a drawing showing a network configuration of the network to which the multifunctional machine shown in FIG. 1 is connected;

FIG. 6 is a drawing for explaining the SDK application service (SAS) of the multifunctional machine shown in FIG. 1;

FIG. 7 is a sequence chart showing a control process utilizing a setting file;

FIGS. 8A through 8C are drawings showing examples of settings stored in the setting file;

FIG. 9 is a sequence chart showing a control process utilizing a setting screen;

FIG. 10 is a drawing showing an example of settings made on the setting screen;

FIGS. 11A and 11B are drawings showing examples of the setting screen for making local settings;

FIG. 12 is a drawing showing an example of the setting screen for making local settings;

FIG. 13 is a drawing showing an example of the setting screen for making local settings;

FIG. 23 is a drawing showing an example of descriptions stored in an application-specific file;

FIG. 24 is a drawing showing an example of descriptions stored in a type-specific file for type-1 application;

FIG. 25 is a drawing showing an example of descriptions stored in the type-specific file for type-2 application;

FIG. 26 is a drawing showing an example of descriptions stored in a basic file;

FIG. 27 is a drawing showing an example of descriptions stored in a language resource file for Japanese;

FIG. 28 is a drawing showing an example of descriptions stored in the language resource file for English;

FIG. 35 is a drawing showing an example of descriptions stored in the language resource file for Japanese;

FIG. 36 is a drawing showing an example of descriptions stored in the language resource file for English;

FIG. 37 is a drawing showing an example of descriptions stored in a header area file;

FIG. 38 is a drawing showing an example of descriptions stored in a menu area file.

DESCRIPTION OF THE PREFERRED EMBODIMENTS

In the following, embodiments of the present invention will be described with reference to the accompanying drawings.

Figure 1:
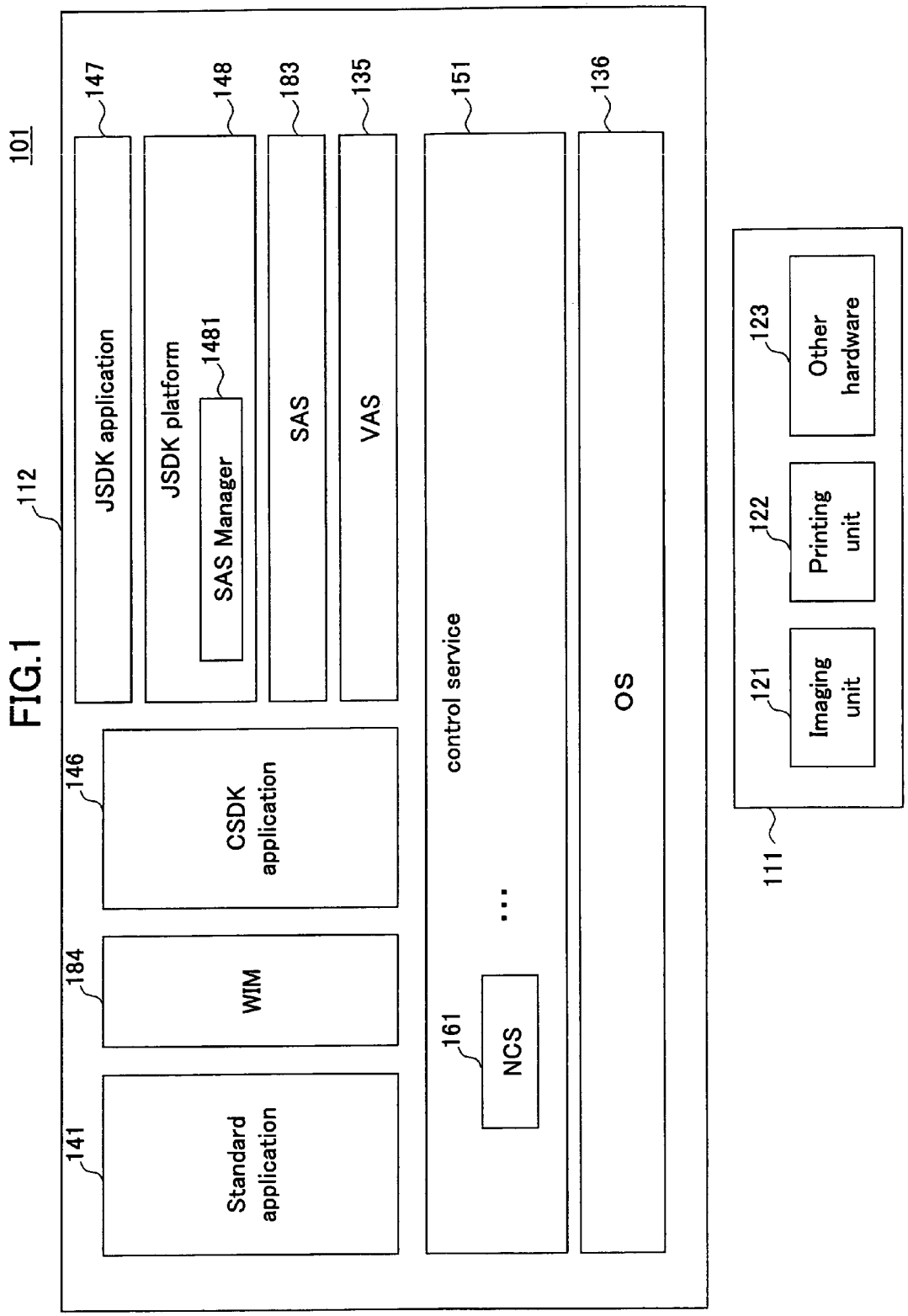
FIG. 1 is a drawing showing a multifunctional machine according to an embodiment of the present invention.

FIG. 1 is a drawing showing a multifunctional machine 101 according to an embodiment of the present invention. The multifunctional machine 101 of FIG. 1 includes various types of hardware 111 and various types of software 112.

The hardware 111 of the multifunctional machine 101 includes an imaging unit 121, a printing unit 122, and other hardware 123. The imaging unit 121 is the hardware for scanning an image (image data) from a scanned document. The printing unit 122 is the hardware for printing an image (image data) on a print sheet.

The software 112 includes a standard application 141, a Web image monitor (WIM) 184, a CSDK application 146, a JSDK application 147, a JSDK platform 148, an SDK application service (SAS) 183, a virtual application service (VAS) 135, a control service 151, and an OS (operating system) 136.

The standard application 141 is a set of various types of applications implemented as a standard set (at the time of shipping out) in the multifunctional machine 101, and includes applications for performing basic functions of the multifunctional machine 101 such as a copier function, a printer function, a scanner function, a facsimile function, etc.

The Web image monitor (WIM) 184 is the software that serves as a Web service for device control.

The multifunctional machine 101 can run an application that is developed by use of a dedicated SDK (software developing kit). An application developed by use of an SDK is referred to as an SDK application. Such a dedicated SDK may include "CSDK" for developing an application based on the C programming language and "JSDK" for developing an application based on the Java (registered trademark) programming language. An application developed by use of the CSDK is referred to as a "CSDK application", and an application developed by use of the JSDK is referred to as a "JSDK application". The multifunctional machine 101 shown in FIG. 1 includes the CSDK application 146 and the JSDK application 147. The multifunctional machine 101 of FIG. 1 further includes the JSDK platform 148, which is a software component for providing an execution environment for the JSDK application 147 written in the Java programming language.

The SDK application service (SAS) 183 is the software for performing the activation control, deactivation control, install control, uninstall control, update control, etc., of the CSDK application 146. In case of conventional Windows (registered trademark) applications or the like, each application is accompanied with its installer. In the multifunctional machine 101, on the other hand, the SDK application service (SAS) 183 provides an integrated service to install and uninstall each application. Since the installing, uninstalling, and so on of each application is integrated under the SDK application service (SAS) 183 in this manner, users are not required to perform different installations for different applications, thereby resulting in the work load being reduced.

The multifunctional machine 101 further includes, in the JSDK platform 148, an SAS Manager (SDK application service manager) 1481 that performs the activation control, deactivation control, install control, uninstall control, update control, etc., of the JSDK application 147. The CSDK application 146 runs as a process whereas the JSDK application 147 runs as a thread. This is why the application management mechanisms are provided separately for the CSDK application 146 and the JSDK application 147. Similarly to the SDK application service (SAS) 183, the SAS Manager 1481 provides an integrated service to install and uninstall each application.

The SDK application service (SAS) 183 can also control the JSDK application 147 via the SAS Manager 1481 in addition to controlling the CSDK application 146. Namely, the SDK application service (SAS) 183 can directly control the CSDK application 146, and can indirectly control the JSDK application 147 via the SAS Manager 1481. In this manner, the application management mechanism for the CSDK application 146 and the application management mechanism for the JSDK application 147 are integrated in such a manner as to provide the SDK application service (SAS) 183 with the function to control the SAS Manager 1481. Since the base portion of the software of the multifunctional machine 101 is written by use of the C programming language, it is preferable to centralize the functions to control the SDK applications in the SDK application service (SAS) 183 that is also written in the C programming language. Because of this, the following description will be given, for the sake of convenience of explanation, as if the control of the JSDK application 147 by the SAS Manager 1481 was performed by the SDK application service (SAS) 183.

The control service 151 is a set of software modules that provide higher-order applications or the like with services to control various hardware resources, and may include a network control service (NCS) 161 that runs as a process for providing service relating to network communication.

The virtual application service (VAS) 135 serves to intermediate between the higher-order JSDK application 147 and the control service 151. The virtual application service (VAS) 135 serves as a server process having the application 141 as a client, and also serves as a client process having the control service 151 as a server. The virtual application service (VAS) 135 is provided with the wrapping function to hide the control service 151, thereby serving to absorb a version-to-version gap generated upon upgrading the version of the control service 151.

The OS 136 is an operating system such as UNIX (registered trademark), on which various software programs run in parallel on a process-by-process basis.

Figure 2:
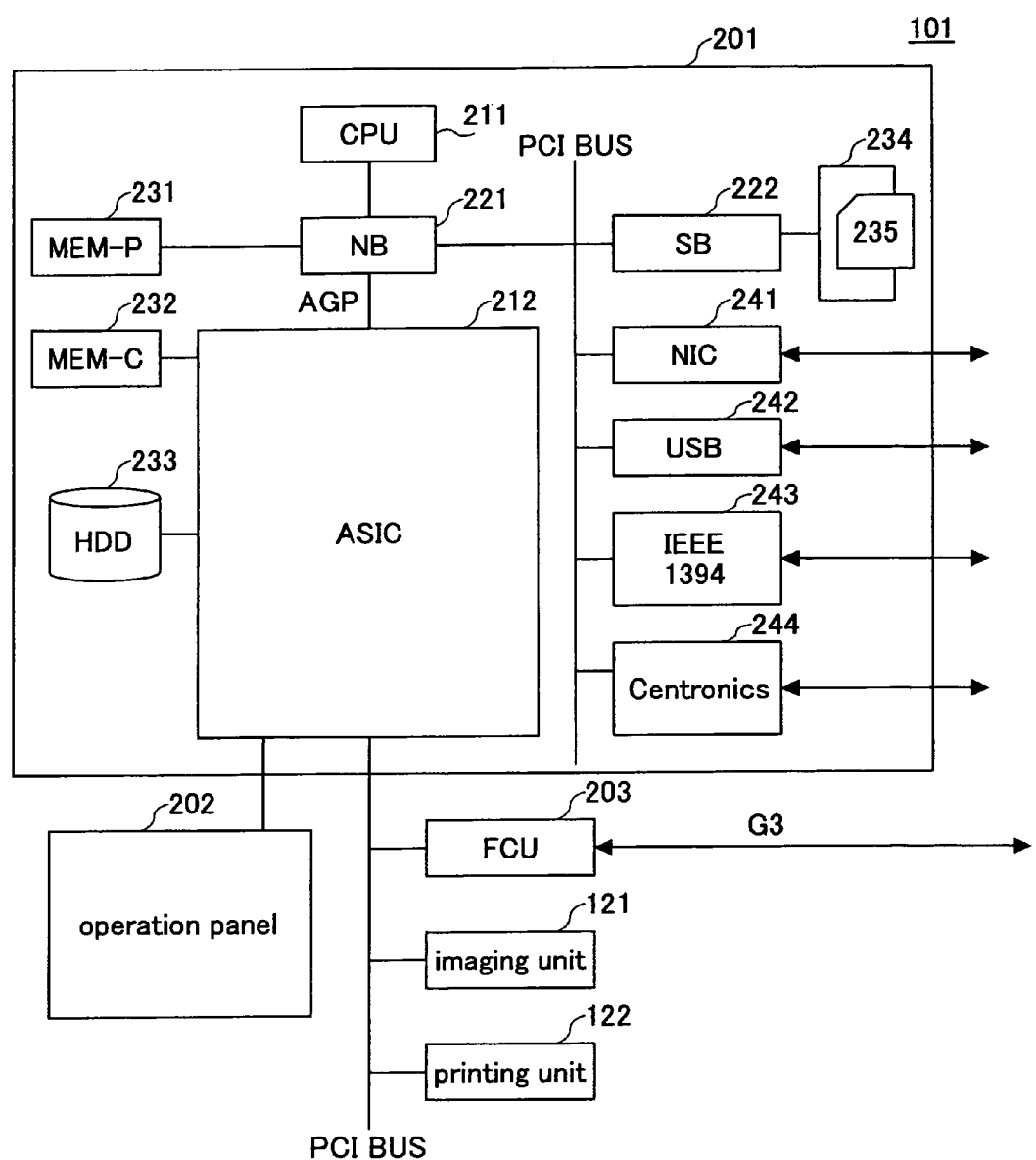
FIG. 2 is a drawing showing the hardware configuration of the multifunctional machine shown in FIG. 1.

FIG. 2 is a drawing showing the hardware configuration of the multifunctional machine 101 shown in FIG. 1. The hardware 111 of the multifunctional machine 101 includes a controller 201, an operation panel 202, a facsimile control unit (FCU) 203, the imaging unit 121, and the printing unit 122.

The controller 201 includes a CPU 211, an ASIC 212, an NB 221, an SB 222, an MEM-P 231, an MEM-C 232, an HDD (hard-disk drive) 233, a memory card slot 234, an NIC (network interface controller) 241, a USB device 242, an IEEE 1394 device 243, and a Centronics device 244.

The CPU 211 is an IC for performing various types of information processing. The ASIC 212 is an IC for performing various types of image processing. The NB 221 is a north bridge of the controller 201. The SB 222 is a south bridge of the controller 201. The MEM-P 231 is a system memory of the multifunctional machine 101. The MEM-C 232 is a local memory of the multifunctional machine 101. The HDD 233 is a storage unit of the multifunctional machine 101. The memory card slot 234 is a slot that receives a memory card 235. The NIC 241 is a controller for network communication based on the MAC address. The USB device 242 serves to provide connection terminals conforming to the USB specification. The IEEE 1394 device 243 serves to provide connection terminals conforming to the IEEE1394 specification. The Centronics device 244 serves to provide connection terminals conforming to the Centronics specification.

The operation panel 202 serves as the hardware unit (operation unit) by which the operator enters an input into the multifunctional machine 101, and also serves as the hardware unit (display unit) through which the operator obtains the output of the multifunctional machine 101.

Figure 3:
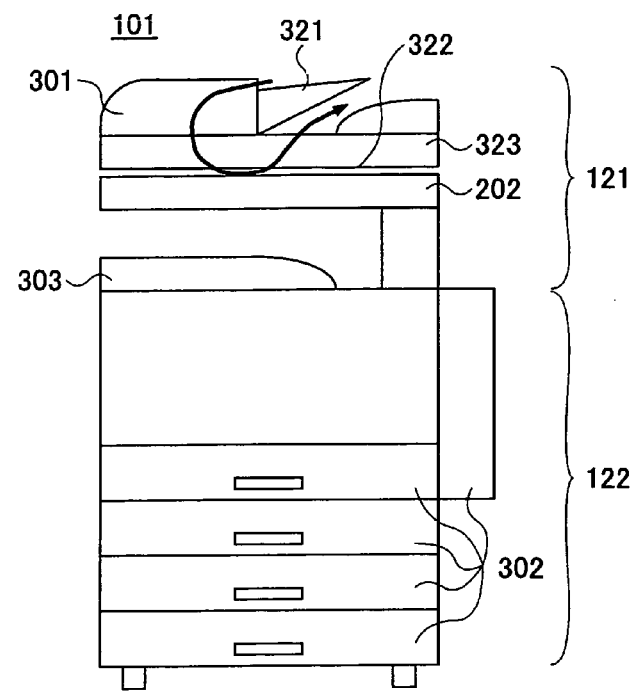
FIG. 3 is a drawing showing an exterior appearance of the multifunctional machine shown in FIG. 1.

FIG. 3 is a drawing showing an exterior appearance of the multifunctional machine 101 shown in FIG. 1. FIG. 3 shows the position of the imaging unit 121, the position of the printing unit 122, and the position of the operation panel 202. FIG. 3 further shows a document table unit 301 on which a document to be scanned is placed, a sheet feeder unit 302 that supplies print sheets, and a catch tray unit 303 onto which printed sheets are ejected.

Figure 4:
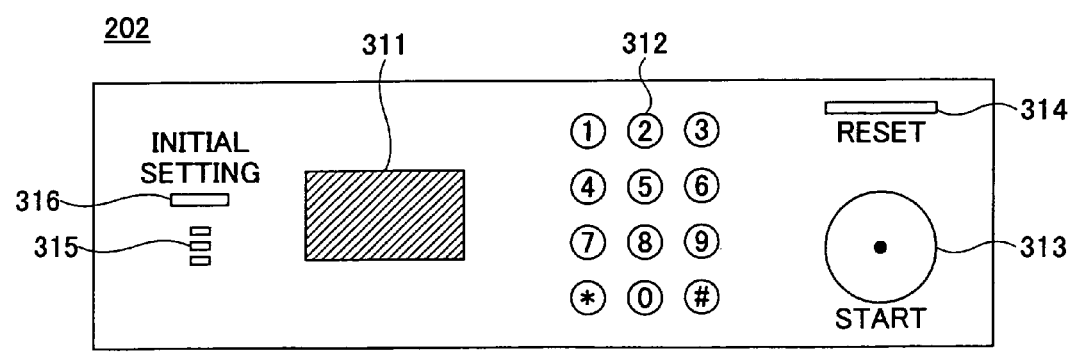
FIG. 4 is an illustrative drawing showing an operation panel.

As shown in FIG. 4, the operation panel 202 includes a touch panel 311, a key pad 312, a start button 313, a reset button 314, function keys 315, and an initial setting button 316. The touch panel 311 serves as the hardware unit (touch operation unit) with which the operator enters an input through touching of the panel, and also serves as the hardware unit (display unit) that presents outputs as displayed information. The key pad 312 is the hardware for entering numbers through key (button) operation. The start button 313 is the hardware for starting an operation through a button touch. The reset button 314 is the hardware for performing a reset operation through a button touch. The function keys 315 are the hardware for displaying an operation screen by the CSDK application 146 or JSDK application 147 upon pressing a key (button). The initial setting button 316 is the hardware for displaying an initial setting screen upon pressing the button.

The document table unit 301 includes an ADF (auto document feeder) 321, a flatbed 322, and a flatbed cover 323. The sheet feeder unit 302 includes four sheet feeder dray and one manual tray. The catch tray unit 303 includes one catch tray.

[SAS]

FIG. 5 is a drawing showing a network configuration of the network to which the multifunctional machine 101 shown in FIG. 1 is connected. The multifunctional machine 101 of FIG. 1 is connected to a PC (personal computer) 401 through the network. The PC 401 includes a PC main body 411, a keyboard 412, a mouse 413, and a display 414. The PC main body 411 has a CPU, ROM, RAM, HDD, MODEM, and NIC implemented therein. The HDD and/or ROM of the PC main body 411 contain a Web browser 421 and an OS 422.

FIG. 6 is a drawing for explaining the SDK application service (SAS) 183 of the multifunctional machine 101 shown in FIG. 1.

The SDK application service (SAS) 183 can control the CSDK application 146 and the JSDK application 147 according to the control settings of the CSDK application 146 and the JSDK application 147. The CSDK application 146 is directly controlled whereas the JSDK application 147 is indirectly controlled via the JSDK platform 148.

As shown as "A" and "B" in FIG. 6, the SDK application service (SAS) 183 can activate or deactivate the CSDK application 146 and the JSDK application 147 according to the activation conditions of the CSDK application 146 and the JSDK application 147. Namely, the activation conditions in this embodiment include the conditions for activating the CSDK application 146 and the JSDK application 147, and also include the conditions for deactivation. Among the activation conditions, the settings of conditions for activation is referred to as "activation settings", and the settings of conditions for deactivation is referred to as "deactivation settings".

For example, a given CSDK application 146 may be activated at a specified time according to the activation settings that indicate the activation of this CSDK application 146 at this specified time. For example, a given JSDK application 147 may be deactivated at a specified time according to the deactivation settings that indicate the deactivation of this JSDK application 147 at this specified time. The deactivation settings may be made as an activation setting that indicates the activation of the CSDK application 146 or JSDK application 147 with a time limit as to how long it will stay activated.

As shown as "C" and "D" in FIG. 6, the SDK application service (SAS) 183 can install or uninstall programs corresponding to the CSDK application 146 and the JSDK application 147 as well as data (library or the like) used by the CSDK application 146 or the JSDK application 147 according to the installation conditions of the CSDK application 146 and the JSDK application 147. Namely, the installation conditions in this embodiment include the conditions for installing the CSDK application 146 and the JSDK application 147, and also include the conditions for uninstalling the applications. Among the installation conditions, the settings of conditions for installation is referred to as "installation settings", and the settings of conditions for uninstallation is referred to as "uninstallation settings".

For example, a given program of the CSDK application 146 may be installed at a specified time according to the installation settings that indicate the installation of this program at this specified time. For example, a given library of the JSDK application 147 may be uninstalled at a specified time according to the uninstallation settings that indicate the uninstallation of this library at this specified time. The uninstallation settings may be made as an installation setting that indicates the installation of a program or library of the CSDK application 146 or JSDK application 147 with a time limit as to how long it will stay installed.

Further, the SDK application service (SAS) 183 may control an authentication process or usage restricting process with respect to the CSDK application 146 or JSDK application 147 in addition to the activation, deactivation, installation, uninstallation of the CSDK application 146 or JSDK application 147.

The SDK application service (SAS) 183 can control the JSDK application 147 according to the control settings of the JSDK application 147 that are stored in a setting file 501 provided for the purpose of managing the JSDK application 147. The setting file 501 is a JNLP file that corresponds one-to-one to a JAR file that is an executable file of the JSDK application 147. The setting file 501 has the control settings of the JSDK application 147 stored therein as a description written in XML (extensible Markup Language). The JNLP file is an XML file, which can define unique tags in its own way, so that the control settings of the JSDK application 147 are written by use of those unique tags. The setting file 501 is stored together with the corresponding JSDK application 147 in the SD memory card. As will later be described, this file may alternatively be managed by a computer on the network.

The SDK application service (SAS) 183 can control the CSDK application 146 or JSDK application 147 according to the control settings of the CSDK application 146 or JSDK application 147 that are made on a setting screen 502, which is provided for the purpose of making settings for the CSDK application 146 and the JSDK application 147. The setting screen 502 may be displayed on the screen (i.e., touch panel 311) of the multifunctional machine 101 for the purpose of making local settings, and may also be displayed, in another case, as a Web screen (Web page) on the screen of a terminal apparatus (i.e., display 414 of the PC 401) of the multifunctional machine 101 for the purpose of making remote settings. It is the SDK application service (SAS) 183 that provides the setting screen 502. A description will later be given of a variation in which the Web image monitor (WIM) 184 provides the setting screen 502.

As described above, the SDK application service (SAS) 183 can control the CSDK application 146 and the JSDK application 147 according to the control settings of the CSDK application 146 and the JSDK application 147. Through the provision of the SDK application service (SAS) 183, such a mechanism is provided that the settings of the CSDK application 146 and JSDK application 147 can be modified on a system-driven basis rather than on an application-driven basis according to where the multifunctional machine 101 is used. That is, there is no need to modify the CSDK application 146 or JSDK application 147 according to where the multifunctional machine 101 is used. The party who modifies the CSDK application 146 or JSDK application 147 may be either a user, a vendor, or a manufacturer of the multifunctional machine 101.

Through activation or deactivation shown as "A" and "B" in FIG. 6, for example, provision may be made such as to activate the CSDK application 146 and JSDK application 147 only at opportune hours when these applications need not be activated all the time. Through install settings or uninstall settings shown as "C" and "D" in FIG. 6, for example, provision may be made such as to install the CSDK application 146 and JSDK application 147 only for a predetermined period when it is desirable to have a limited install period for these applications. When the types of the control settings need to be increased, the property of XML that allows unique tags to be defined in its own way may serve a significant purpose. When it is desirable to make settings on the screen of the multifunctional machine 101, the screen for making local settings may be convenient. When it is desirable to make complicated settings on the screen of the PC 401, the screen for making remote settings may prove to be useful.

FIG. 7 is a sequence chart showing a control process utilizing the setting file 501.

As a vender of the multifunctional machine 101 enters a command into the multifunctional machine 101 to start the installation of an option library 511 of a certain JSDK application 147 (S11), the SDK application service (SAS) 183 acquires the installation settings of this JSDK application 147 from the setting file 501 of this JSDK application 147 (S12). Then, the SDK application service (SAS) 183 accesses the JSDK application 147 to check the appropriateness of the acquired installation settings (S13). Then, the SDK application service (SAS) 183 downloads the option library 511 of the JSDK application 147 from an option library server 512 (S14). The SDK application service (SAS) 183 accesses the downloaded option library 511 to check the appropriateness of the acquired installation settings (S15). The SDK application service (SAS) 183 installs the downloaded option library 511 in the HDD 233 or SD memory card 235 according to the acquired installation settings (S16).

FIGS. 8A through 8C are drawings showing examples of settings stored in the setting file 501.

A description A in example 1 indicates that this sentence is an installation setting for installing the option library 511 of the JSDK application 147. A description B in the example 1 indicates that what is to be installed is the version 1.3 of the option library 511. A description C in the example 1 indicates that the option library 511 will be installed in an application specific area. A description D in the example 1 indicates that the option library 511 will be downloaded from the http://www.r.com/jsdk/option/option.jar.

A description A in example 2 indicates that this sentence is an installation setting for installing the option library 511 of the JSDK application 147. A description B in the example 2 indicates that what is to be installed is the latest version of the option library 511. A description C in the example 2 indicates that the option library 511 will be installed in a system shared area. A description D in the example 2 indicates that the option library 511 will be downloaded from the http://www.r.com/jsdk/option/option.jar.

A description A in example 3 indicates that this sentence is an installation setting for installing the option library 511 of the JSDK application 147. A description B in the example 3 indicates that what is to be installed is any version of the option library 511. In this case, what is to be actually installed will be selected on the screen. A description C in the example 3 indicates that the option library 511 will be installed in a system shared area. A description D in the example 3 indicates that the option library 511 will be downloaded from the http://www.r.com/jsdk/option/option.jar. A description E in the example 3 indicates that Dec. 31, 2010 is the expiration date of the period during which the option library 511 is kept installed.

FIG. 9 is a sequence chart showing a control process utilizing the setting screen 502.

As a user of the multifunctional machine 101 enters a command on the setting screen 502 for installation purposes to start the installation of a certain JSDK application 147 (S21), the SDK application service (SAS) 183 acquires the installation settings of this JSDK application 147 from the setting file 501 of this JSDK application 147 (S22). Then, the SDK application service (SAS) 183 displays the setting screen 502 for the purpose of making valid period settings regarding a period during which the JSDK application 147 will be kept installed (S23).

The user of the multifunctional machine 101 enters valid period data indicative of the period during which the JSDK application 147 will be kept installed on the setting screen 502 for setting a valid period (S24), and, in response, the SDK application service (SAS) 183 accesses the JSDK application 147 to check the appropriateness of the entered installation settings (valid period settings) (S25). The SDK application service (SAS) 183 stores the entered installation settings in a nonvolatile memory 521 of the multifunctional machine 101 (S26), and installs the JSDK application 147 in the HDD 233 or SD memory card 235 according to the acquired installation settings (S27). Then, the SDK application service (SAS) 183 deactivates the display of the setting screen 502 for making valid period settings (S28).

FIG. 10 is a drawing showing an example of the settings made on the setting screen 502. FIG. 10 shows a setting screen 502B for making valid period settings to specify a period during which an installed state is maintained, with a setting screen 502A for installation settings being displayed under the setting screen 502B. FIG. 10 shows that Dec. 31, 2010 is entered as an expiry date of the period during which an installed state is maintained.

FIGS. 11A and 11B, FIG. 12, and FIG. 13 are drawings showing examples of the setting screen 12 for making local settings. The setting screen 502 shown in FIGS. 11A and 11B is used to make a setting to the installation of the CSDK application 146 and/or JSDK application 147. The setting screen 502 shown in FIG. 12 is used to make a setting to the uninstallation of the CSDK application 146 and/or JSDK application 147. The setting screen 502 shown in FIG. 13 is used to make a setting to the activation and deactivation of the CSDK application 146 and/or JSDK application 147.

The setting screen 502 shown in FIG. 11A and the setting screen 502 shown in FIG. 11B are a series of setting screens for making an installation setting. FIG. 11B shows a setting screen 502' for making an automatic activation setting to the CSDK application 146 and/or JSDK application 147, with the setting screen 502 for installation settings being displayed under the setting screen 502'. In this manner, the setting screen 502 for making installation settings may be used to make a setting to the activation and/or deactivation of the CSDK application 146 and/or JSDK application 147. Further, the setting screen 502 for making installation settings may be used to make a setting to the installation and/or uninstallation of the CSDK application 146 and/or JSDK application 147. This is what is illustrated in the setting screen of FIG. 10.

Figure 14A:
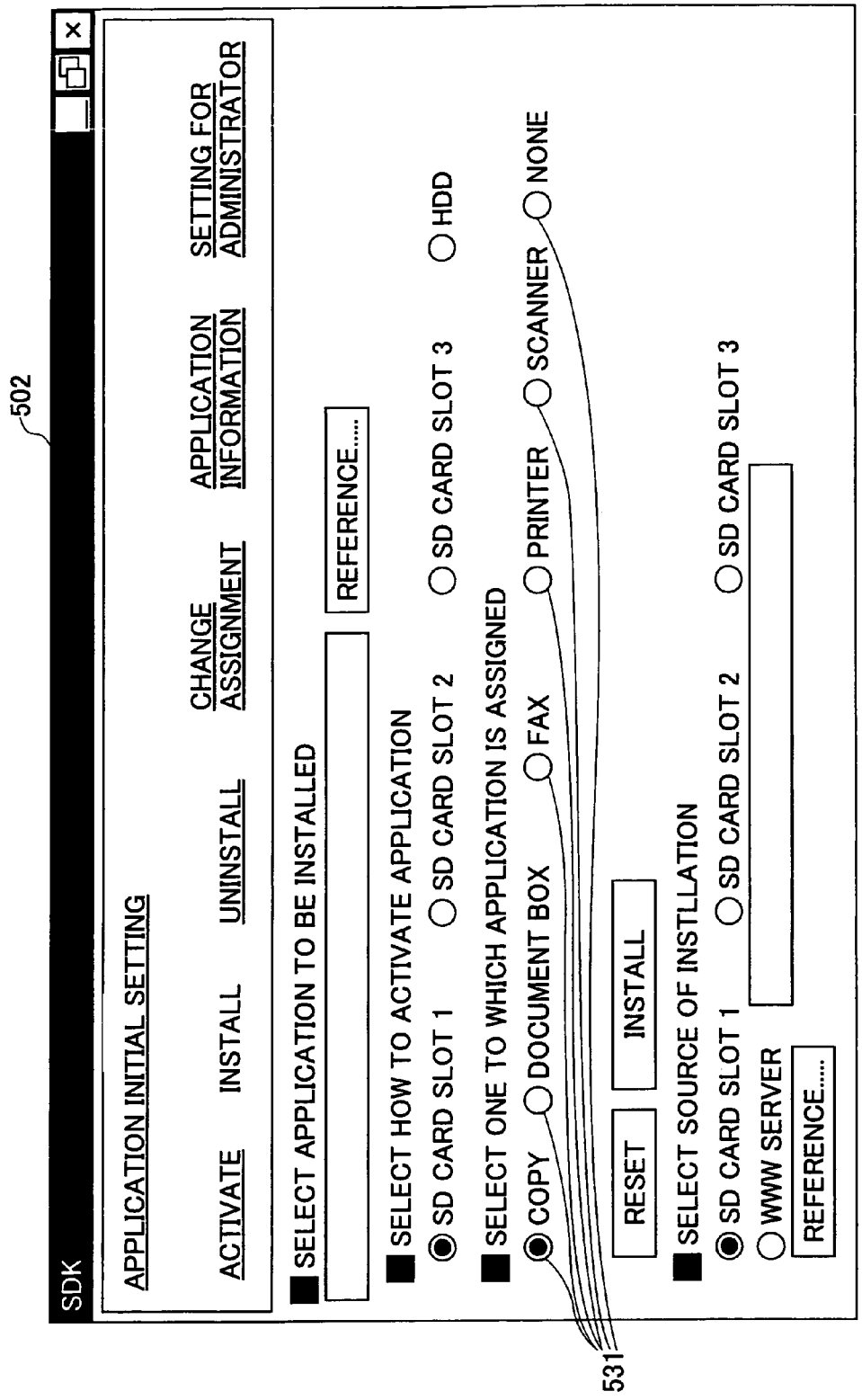
FIGS. 14A and 14B are drawings showing examples of the setting screen for making remote settings.
Figure 14B:
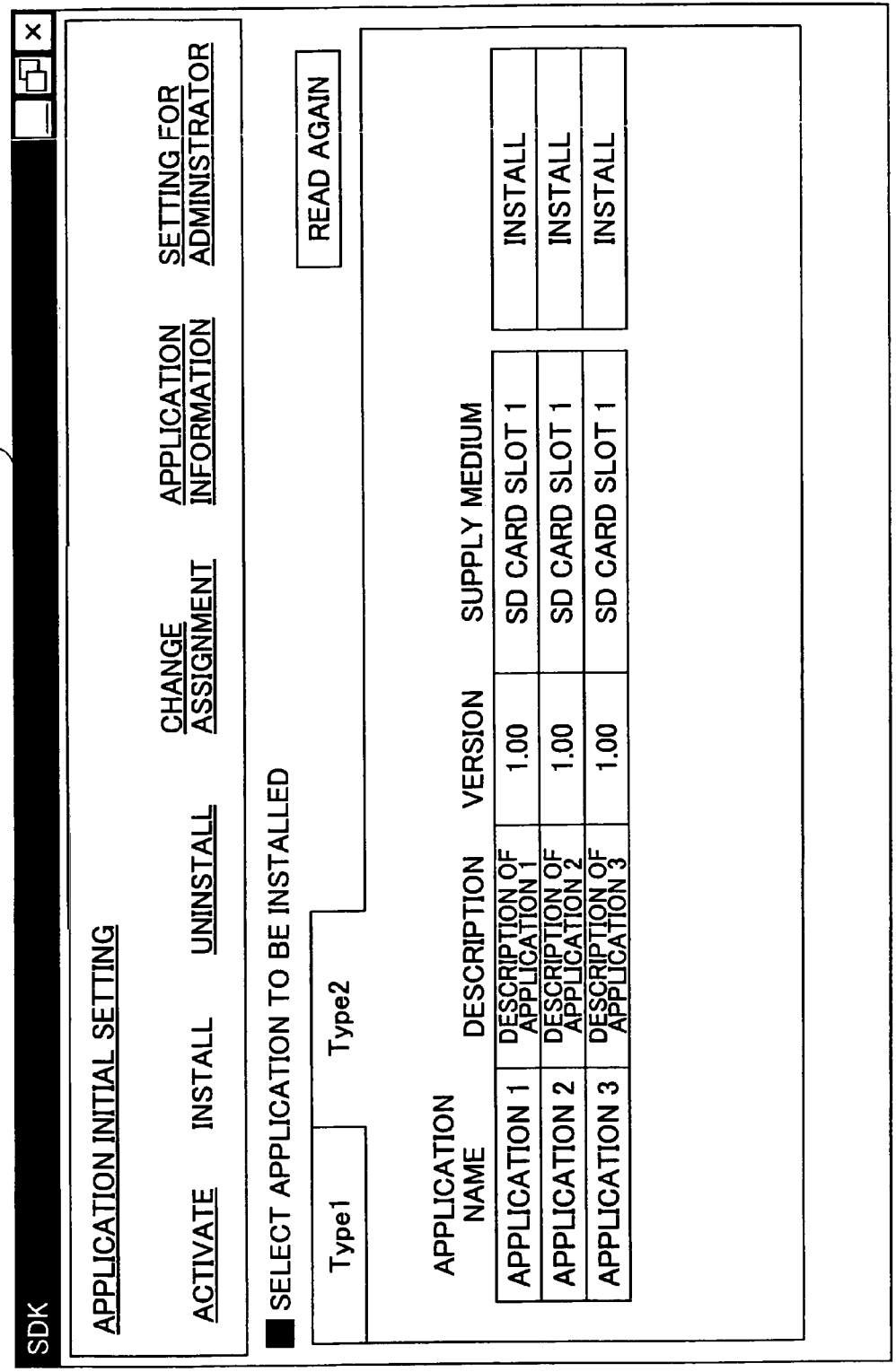
Figure 15A:
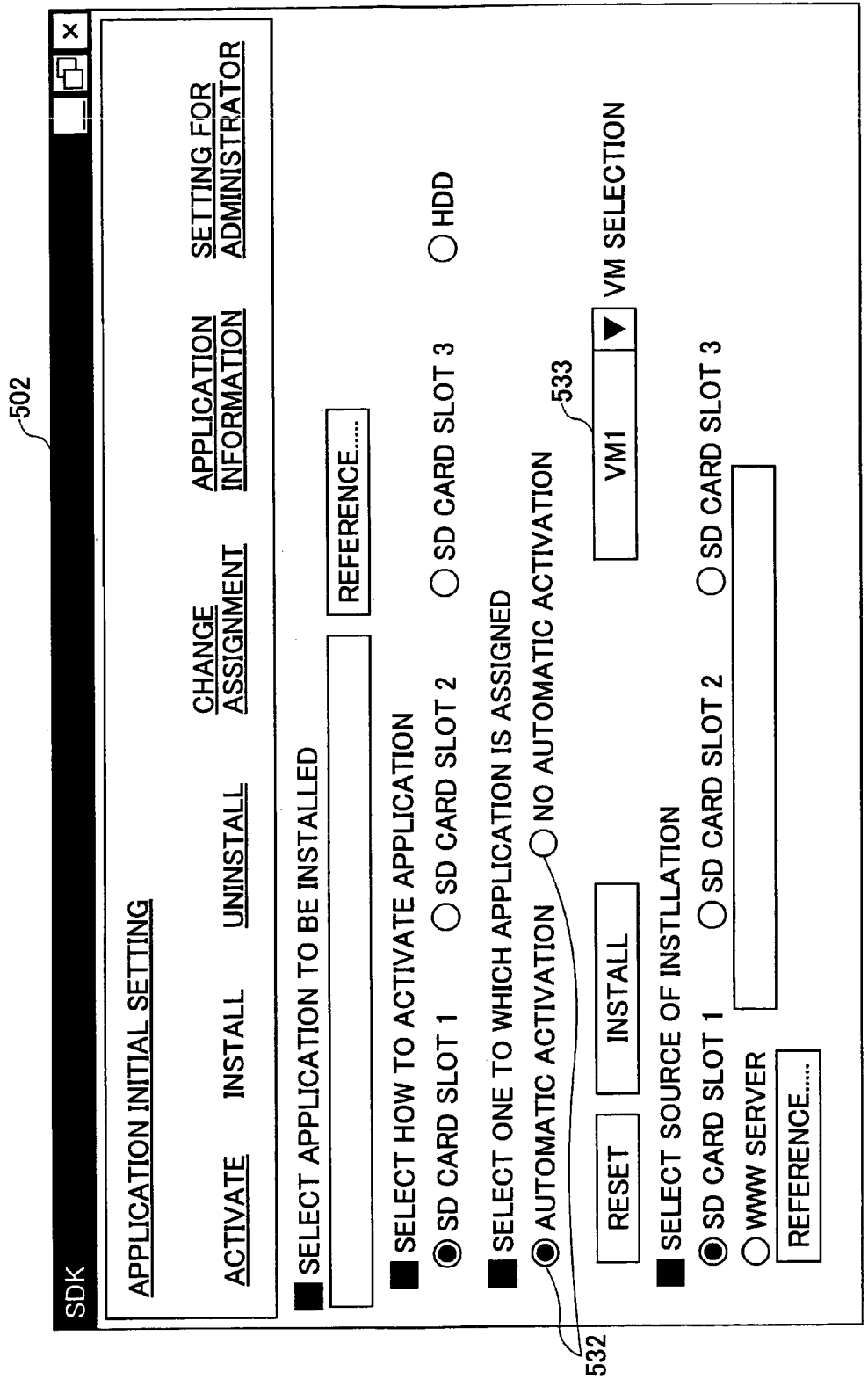
FIGS. 15A and 15B are drawings showing examples of the setting screen for making remote settings.
Figure 15B:
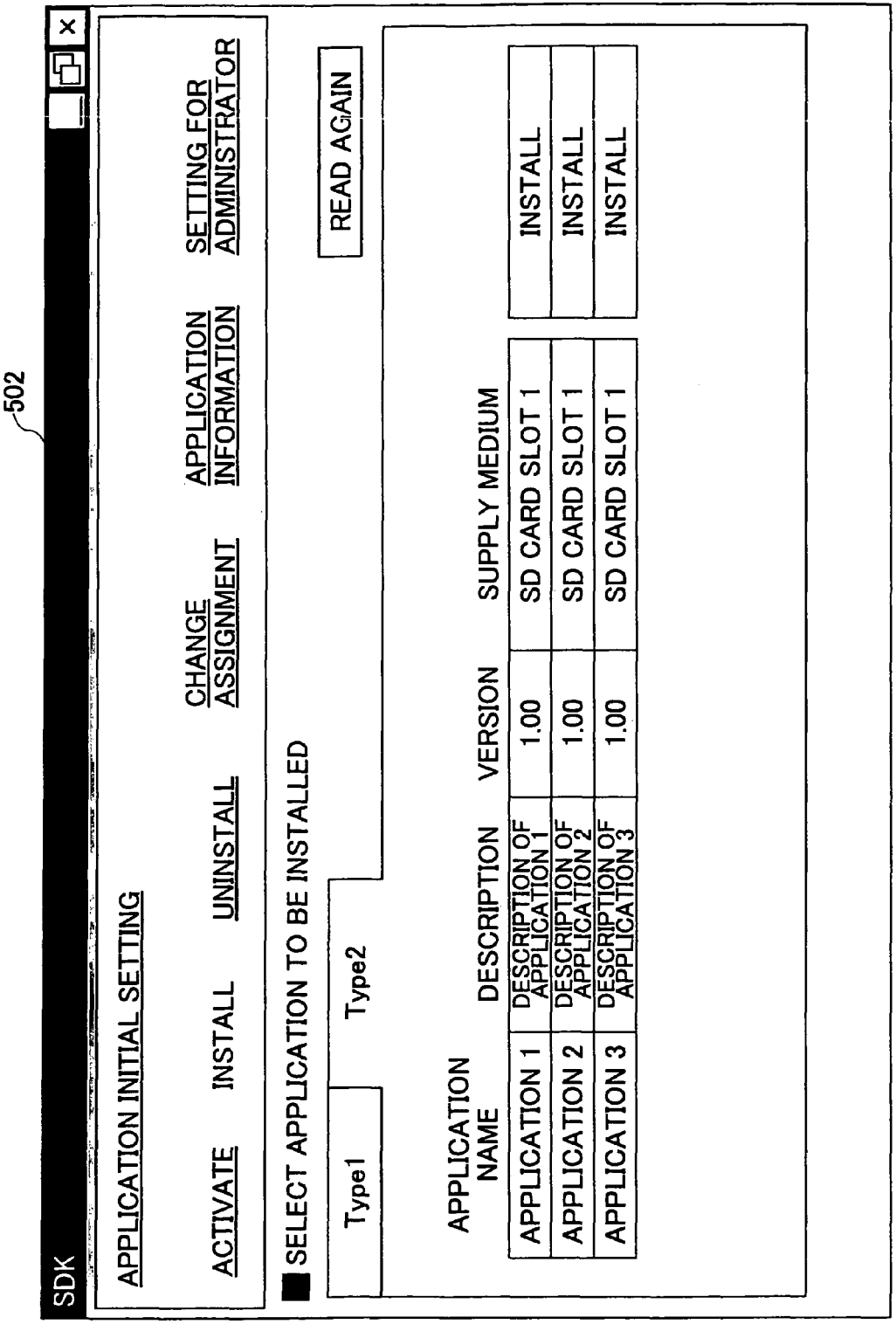
Figure 16:
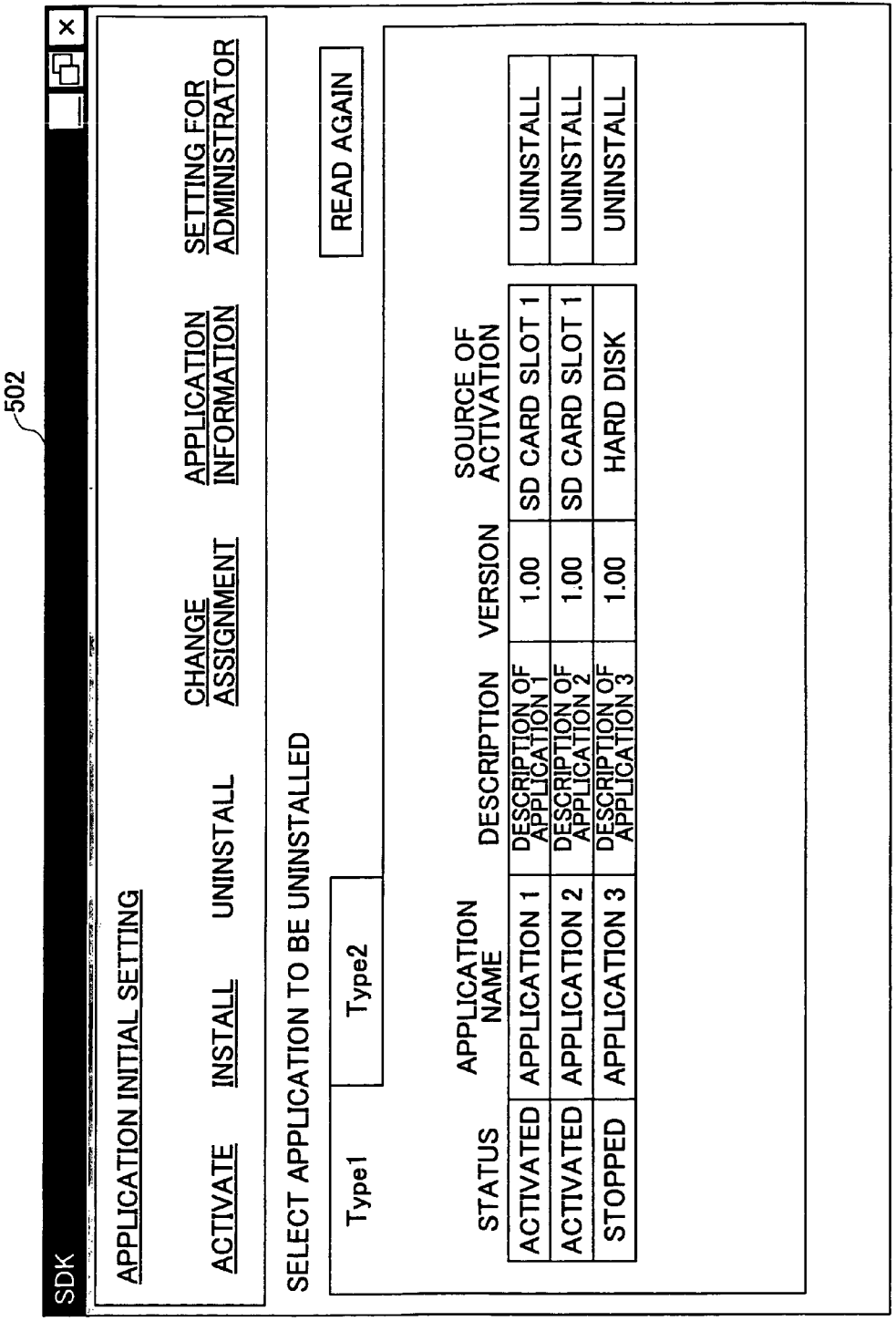
FIG. 16 is a drawing showing an example of the setting screen for making remote settings.
Figure 17:
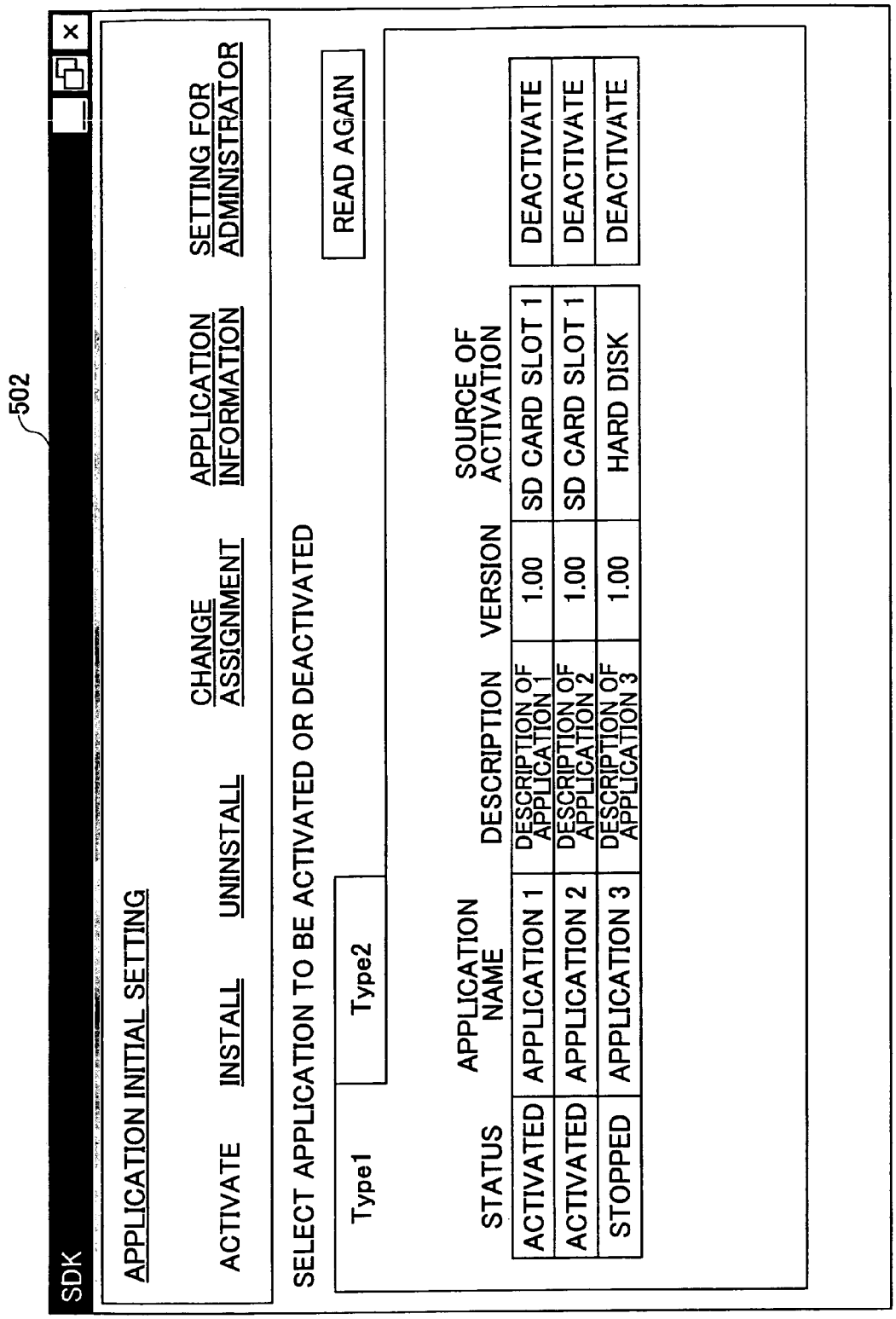
FIG. 17 is a drawing showing an example of the setting screen for making remote settings.

FIGS. 14A and 14B, FIGS. 15A and 15B, FIG. 16, and FIG. 17 are drawings showing examples of the setting screen 502 for making remote settings. The setting screen 502 shown in FIGS. 14A and 14B is used to make a setting to the installation of the CSDK application 146 (type-1 application). The setting screen 502 shown in FIGS. 15A and 15B is used to make a setting to the installation of the JSDK application 147 (type-2 application). The setting screen 502 shown in FIG. 16 is used to make a setting to the uninstallation of the CSDK application 146 and/or JSDK application 147. The setting screen 502 shown in FIG. 17 is used to make a setting to the activation and deactivation of the CSDK application 146 and/or JSDK application 147.

The setting screen 502 shown in FIG. 14A and the setting screen 502 shown in FIG. 14B are a series of setting screens for making an installation setting to the CSDK application 146. FIG. 11A shows radio buttons 531 for selecting functional key assignments of the CSDK application 146 on the setting screen 502 for making an installation setting.

The setting screen 502 shown in FIG. 15A and the setting screen 502 shown in FIG. 15B are a series of setting screens for making an installation setting to the JSDK application 147. FIG. 15A shows, on the setting screen 502 for making an installation setting, radio buttons 532 for making automatic activation settings to the JSDK application 147 and a combo box 533 for selecting a version of the Java virtual machine (VM) that causes the JSDK application 147 to be performed. In this manner, the setting screen 502 for making installation settings may be used to make a setting to the activation and/or deactivation of the CSDK application 146, the JSDK application 147, and so on according to the types of applications each having different activation conditions. Further, the setting screen 502 for making installation settings may be used to make a setting to the installation and/or uninstallation of the CSDK application 146 and/or JSDK application 147. The setting screen as shown in FIG. 10 is replaced by the radio buttons as shown in FIG. 14.

Figure 18:
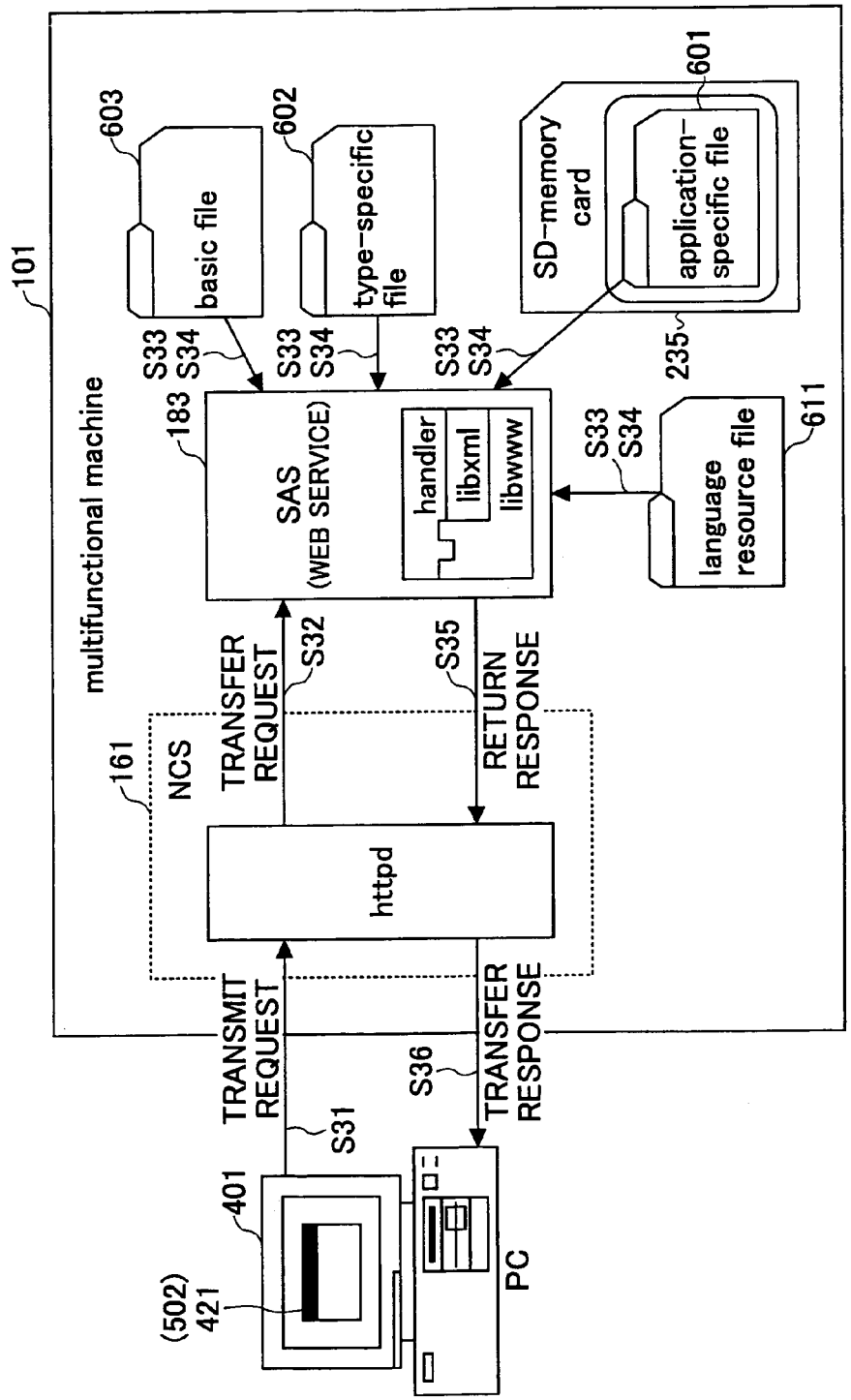
FIG. 18 is a drawing for explaining the method of providing the setting screen by the SDK application service (SAS)

FIG. 18 is a drawing for explaining the method of providing the setting screen 502 by the SDK application service (SAS) 183.

In order to display the setting screen 502, the Web browser 421 of the PC 401 issues a request directed to the Web service of the SDK application service (SAS) 183 (S31). In response, the httpd of the control service (NCS) 161 transfers the request to the Web service of the SDK application service (SAS) 183 (S32). The SDK application service (SAS) 183 then acquires items to be displayed on the setting screen 502 from the item storage (S33), followed by generating the setting screen 502 by using the items acquired from the item storage (S34). In order to display the setting screen 502, the Web service of the SDK application service (SAS) 183 issues a response directed to the Web browser 421 of the PC 401 (S35). In response, the httpd of the control service (NCS) 161 transfers the response to the Web browser 421 of the PC 401 (S32). In this manner, the SDK application service (SAS) 183 presents the setting screen 502 for making an installation setting to the CSDK application 146 and/or JSDK application 147.

The items to be displayed on the setting screen 502 are acquired from an application-specific file 601, a type-specific file 602, and a basic file 603. The application-specific file 601 stores items that are unique to each application such as each CSDK application 146 or each JSDK application 147. The type-specific file 602 stores items that are unique to each application type such as an type-1 application (CSDK application 146) or type-2 application (JSDK application 147). In this embodiment, applications are classified into respective types according to the programming languages used in the implementation of the applications and/or the differences of activation conditions. For example, the type-2 application is coded by use of the Java programming language, and allows the presence/absence of automatic activation to be specified. On the other hand, the type-1 application is coded by use of the C programming language, and does not allow the presence/absence of automatic activation to be specified.

The basic file 603 stores items that are shared by all types of applications. The SDK application service (SAS) 183 generates and displays the setting screen 502 by using items acquired from the application-specific file 601, items acquired from the type-specific file 602, and items acquired from the basic file 603. The contents of each item that is to be presented on the setting screen 502 in relevant language are acquired from a language resource file 611.

Figure 19:
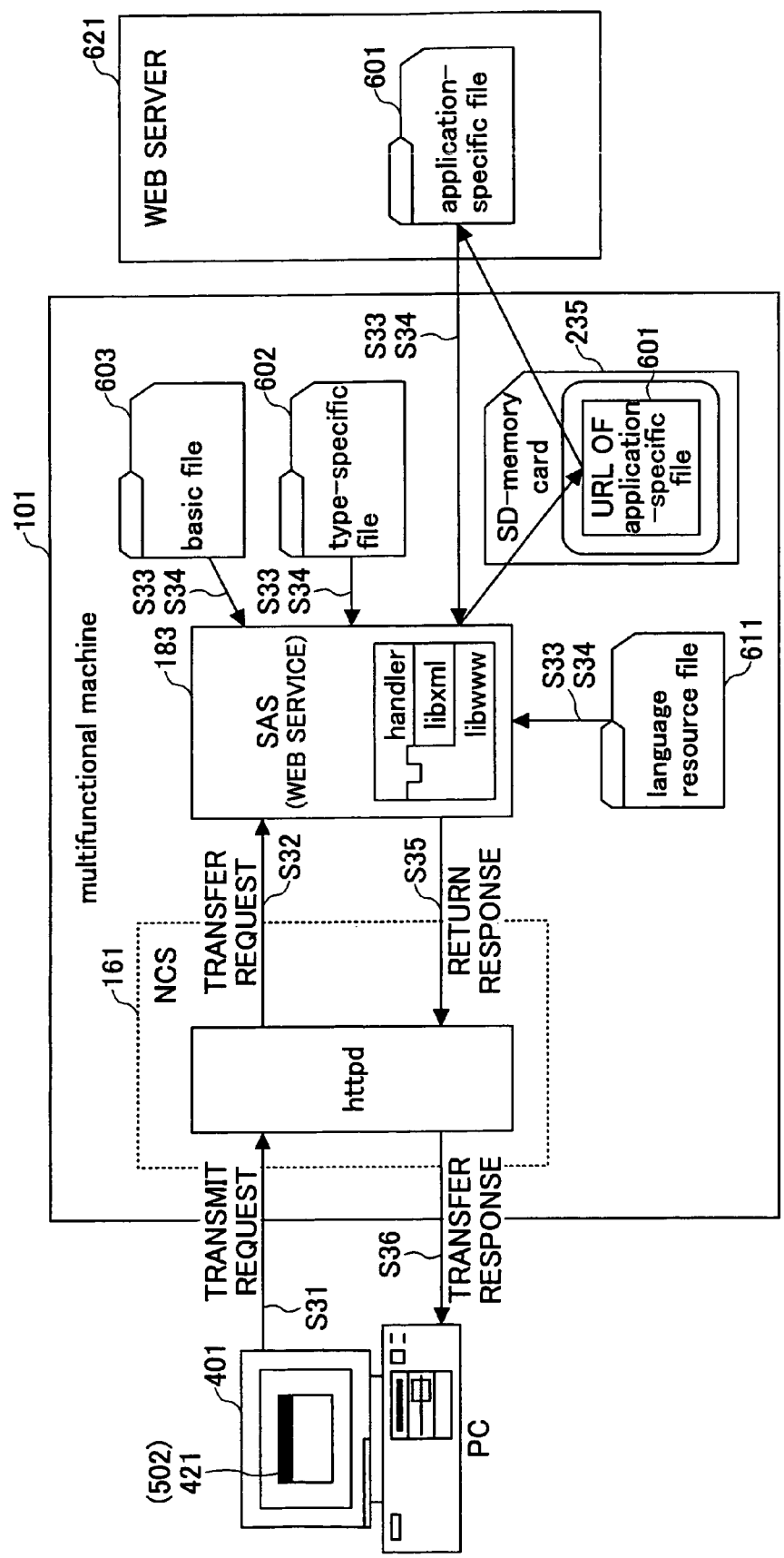
FIG. 19 is a drawing for explaining a variation of the method of providing the setting screen by the SDK application service (SAS)

The application-specific file 601, the type-specific file 602, and the basic file 603 are stored in the multifunctional machine 101 as shown in FIG. 18. The application-specific file 601 may alternatively be stored outside the multifunctional machine 101 as shown in FIG. 19. In this case, information indicative of the location (URL or the like) of the application-specific file 601 is stored in the multifunctional machine 101. The application-specific file 601 is stored in the SD memory card 235 in FIG. 18, and is stored in the Web server 621 in FIG. 19. The application-specific file 601 may be a separate file from the executable file of the application, or may be the executable file of the application.

Figure 20:
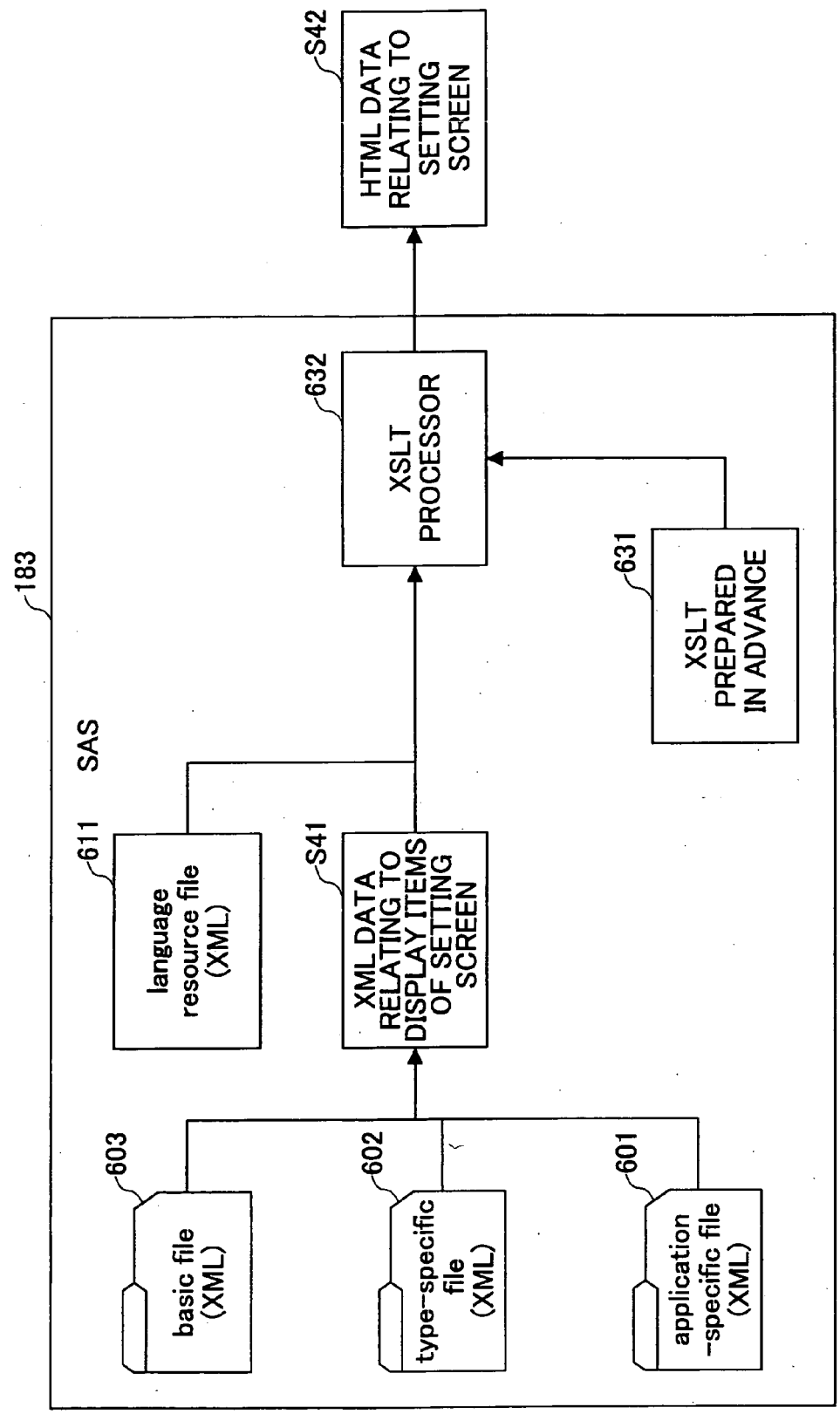
FIG. 20 is a drawing for explaining the method of generating the setting screen by the SDK application service (SAS)

FIG. 20 is a drawing for explaining the method of generating the setting screen 502 by the SDK application service (SAS) 183.

The items to be displayed on the setting screen 502 are stored in the application-specific file 601, type-specific file 602, and basic file 603 as descriptions using XML. Since XML can define unique tags in its own way, the items to be displayed on the setting screen 502 are described by use of these unique tags. The SDK application service (SAS) 183 generates XML data relating to the items to be displayed on the setting screen 502 by using XML data acquired from the application-specific file 601, XML data acquired from the type-specific file 602, and XML data acquired from the basic file 603 (S41).

It should be noted that a request (S31) from the PC 401 to the SDK application service (SAS) 183 and a response (S35) from the SDK application service (SAS) 183 to the PC 401 is comprised of HTML data. The SDK application service (SAS) 183 uses an XSLT 631 that is prepared in advance, so that an XSLT processor 632 converts the XML data relating to the items to be displayed on the setting screen 502 into HTML data relating to the setting screen 502 (S42).

Figure 21:
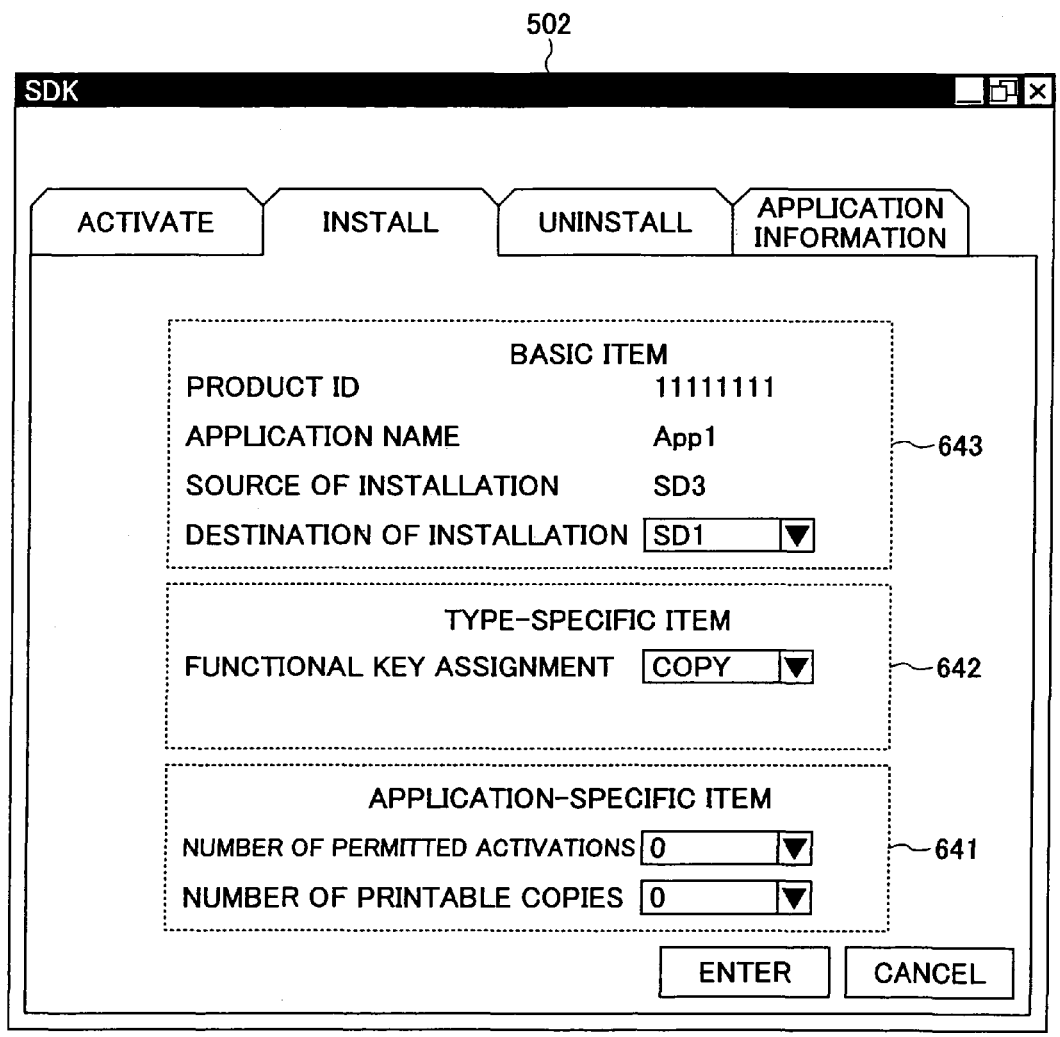
FIG. 21 is a drawing showing an example of the setting screen generated by the SDK application service (SAS)
Figure 22:
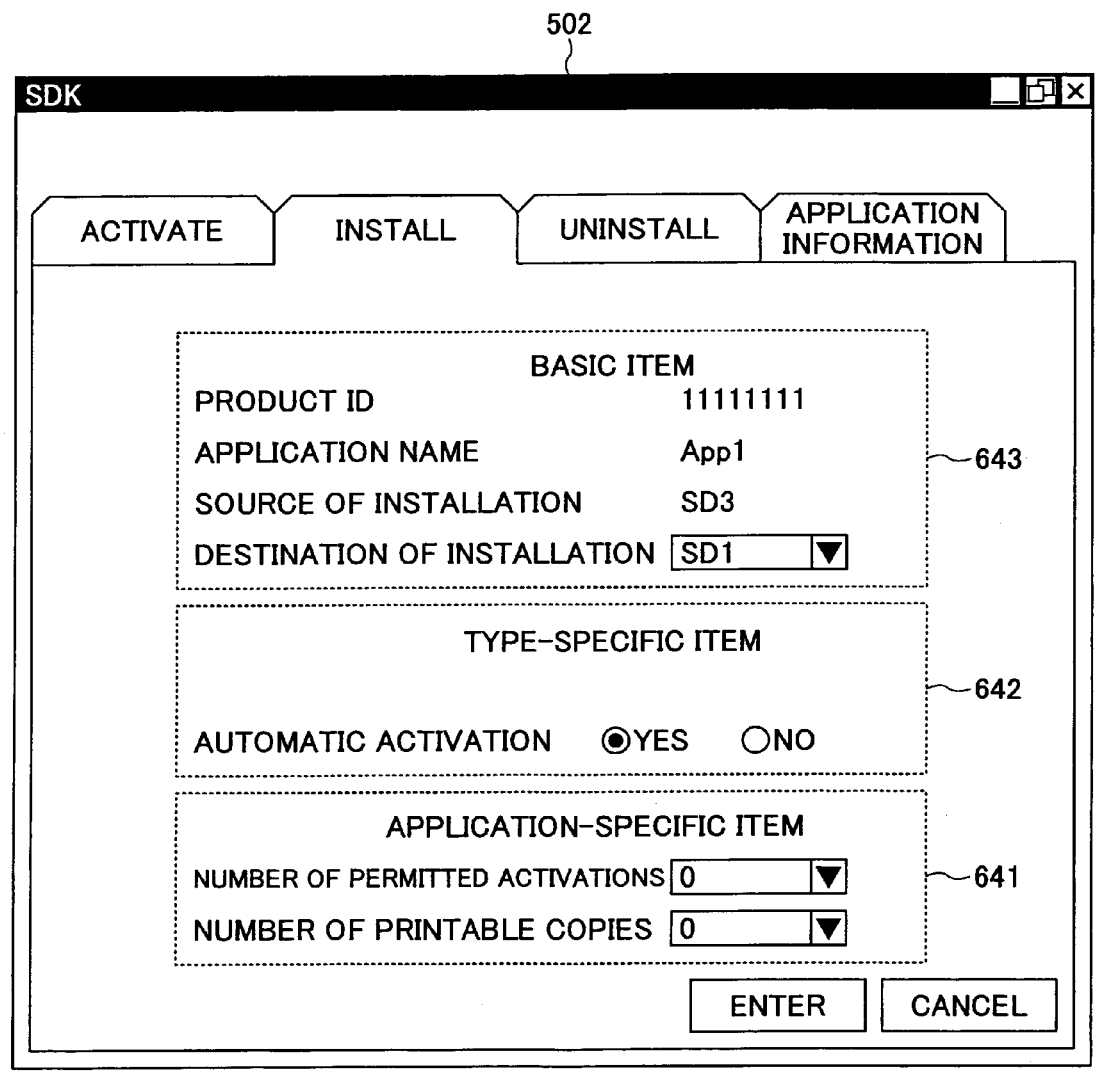
FIG. 22 is a drawing showing an example of the setting screen generated by the SDK application service (SAS)

FIG. 21 and FIG. 22 are drawings showing examples of the setting screen 502 generated by the SDK application service (SAS) 183. FIG. 21 shows the setting screen 502 for use for the type-1 application, and FIG. 22 shows the setting screen 502 for use for the type-2 application. Each setting screen 502 includes an application-specific area 641, a type-specific area 642, and a basic area 643.

The application-specific area 641 displays the items that are unique to the application such as the number of possible activations and the number of printable copies. In the case of a copy application for performing a printing process, the number of printable copies may be displayed. In the case of a facsimile application for performing a transmission process, the number of transmittable sheets may be displayed.

The type-specific area 642 displays the items that are unique to the application type such as a functional key assignment and an automatic activation setting. In the case of a type-1 application for which one application is assigned to one functional key 315 upon the execution of one process for one application, items such as functional key assignments are displayed (see FIG. 21). In the case of a type-2 application for which two or more applications are assigned to one functional key 315 upon the execution of one process for two or more applications, items such as automatic activation settings or the like are displayed (see FIG. 22).

The basic area 643 displays the items that are shared by all the application types such as a product ID, an application name, an installation source, an installation destination, etc.

The description provided with reference to FIG. 18, FIG. 19, FIG. 20, and FIG. 21 has been directed to the setting screen 502 for making remote settings, but may as well be applicable to the setting screen 502 for making local settings. The SDK application service (SAS) 183 generates and displays the setting screen 502 for making local settings or the setting screen 502 for making remote settings by using items acquired from the application-specific file 601, items acquired from the type-specific file 602, and items acquired from the basic file 603.

In the description given with reference to FIG. 18, FIG. 19, FIG. 20, and FIG. 21, applications are classified according to the programming languages of these applications. The type-1 application (CSDK application 146) is written in the C programming language, and the type-2 application (JSDK application 147) is written in the Java programming language. It should be noted that application may alternatively be classified into types according to other than their programming languages. Further, applications may be classified into two types, or may be classified into three or more types.

As described above, the SDK application service (SAS) 183 can provide the comprehensive setting screen 502 by which settings can be made to various CSDK applications 146 and/or JSDK applications 147. Through the provision of the setting screen 502, a user friendly interface is provided such that the settings of the CSDK application 146 and/or JSDK application 147 can be modified on a system-driven basis rather than on an application-driven basis.

When the types of the display items need to be increased, the property of XML that allows unique tags to be defined in its own way may serve a significant purpose. When it is desirable to make settings on the screen of the multifunctional machine 101, the screen for making local settings may be convenient. When it is desirable to make complicated settings on the screen of the PC 401, the screen for making remote settings may prove to be useful.

FIG. 23 is a drawing showing an example of descriptions stored in the application-specific file 601. A description 21A shown in FIG. 23 specifies that the item "number of permitted activations" is an item to be displayed in the application-specific area 641. A description 21B shown in FIG. 23 specifies that the item "number of permitted copies" is an item to be displayed in the application-specific area 641.

FIG. 24 is a drawing showing an example of descriptions stored in the type-specific file 602 (for type-1 application). A description 22A shown in FIG. 24 specifies that the item "functional key assignments" is an item to be displayed in the type-specific area 642.

FIG. 25 is a drawing showing an example of descriptions stored in the type-specific file 602 (for type-2 application). A description 23A shown in FIG. 25 specifies that the item "setting of automatic activation" is an item to be displayed in the type-specific area 642.

FIG. 26 is a drawing showing an example of descriptions stored in the basic file 603. A description 24A shown in FIG. 26 specifies that the item "product ID" is an item to be displayed in the basic area 643. A description 24B shown in FIG. 26 specifies that the item "application name" is an item to be displayed in the basic area 643. A description 24C shown in FIG. 26 specifies that the item "installation source" is an item to be displayed in the basic area 643. A description 24C shown in FIG. 26 specifies that the item "installation destination" is an item to be displayed in the basic area 643.

FIG. 27 is a drawing showing an example of descriptions stored in the language resource file 611 (for Japanese). A description 25A shown in FIG. 27 specifies the Japanese-language expressions of the items to be displayed in the application-specific area 641. A description 25B shown in FIG. 27 specifies the Japanese-language expressions of the items to be displayed in the type-specific area 642. A description 25C shown in FIG. 27 specifies the Japanese-language expressions of the items to be displayed in the basic area 643.

FIG. 28 is a drawing showing an example of descriptions stored in the language resource file 611 (for English). A description 26A shown in FIG. 28 specifies the English-language expressions of the items to be displayed in the application-specific area 641. A description 26B shown in FIG. 28 specifies the English-language expressions of the items to be displayed in the type-specific area 642. A description 26C shown in FIG. 28 specifies the English-language expressions of the items to be displayed in the basic area 643.

Figure 29:
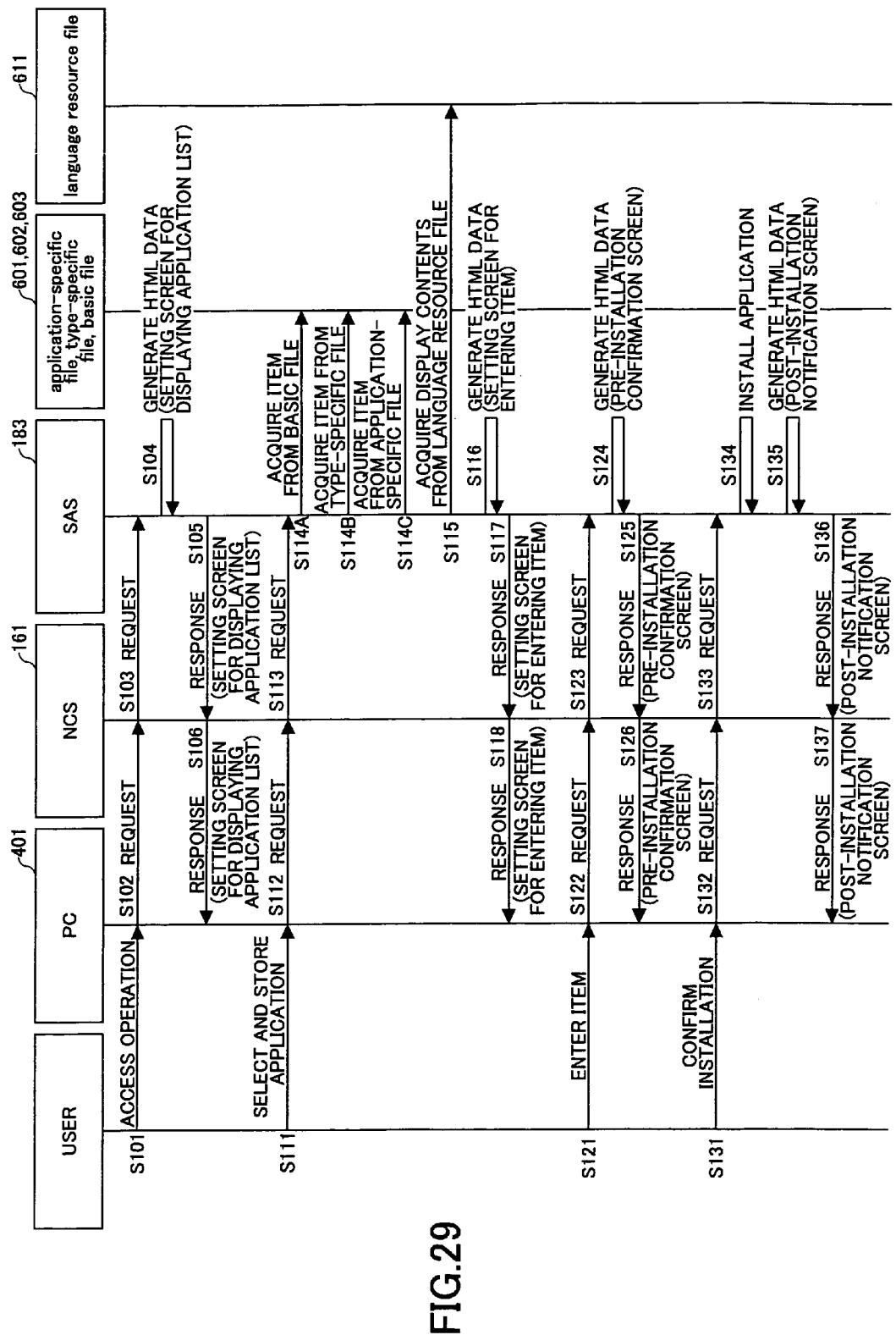
FIG. 29 is a sequence chart showing the process of providing the setting screen by the SDK application service (SAS)

FIG. 29 is a sequence chart showing the process of providing the setting screen 502 by the SDK application service (SAS) 183.

A user of the PC 401 performs an action (S101) to access the Web service of the SDK application service (SAS) 183, resulting in the request to access the Web service of the SDK application service (SAS) 183 being transmitted (S102) from the PC 401 to the control service (NCS) 161, and being transferred (S103) from the control service (NCS) 161 to the SDK application service (SAS) 183. Then, the SDK application service (SAS) 183 generates HTML data relating to the setting screen 502 for displaying an application list (S104). A response indicative of displaying the setting screen 502 for displaying an application list is transmitted (S105) from the SDK application service (SAS) 183 to the control service (NCS) 161, and is then transferred (S106) from the control service (NCS) 161 to the PC 401.

Then, an action (S111) to select an application is performed on the setting screen 502 for displaying an application list, resulting in a request associated with the selection of an application being transmitted (S112) from the PC 401 to the control service (NCS) 161, and being transferred (S113) from the control service (NCS) 161 to the SDK application service (SAS) 183. The SDK application service (SAS) 183 then acquires items to be displayed on the setting screen 502 for entering items (i.e., the setting screen shown in FIG. 21) from the basic file 603, the type-specific file 602, and the application-specific file 601 (S114A, S114B, S114C). Then, the SDK application service (SAS) 183 acquires the contents of the items to be displayed on the setting screen 502 for entering items from the language resource file 611 (S115). The SDK application service (SAS) 183 generates HTML data (S116) relating to the setting screen 502 for entering items by using the items acquired from the basic file 603, the items acquired from the type-specific file 602, the items acquired from the application-specific file 601, and the display contents acquired from the language resource file 611. A response indicative of displaying the setting screen 502 for entering items is transmitted (S117) from the SDK application service (SAS) 183 to the control service (NCS) 161, and is then transferred (S118) from the control service (NCS) 161 to the PC 401.

Then, an action (S121) to enter an item is performed on the setting screen 502 for entering items, resulting in a request associated with the entering of an item being transmitted (S122) from the PC 401 to the control service (NCS) 161, and being transferred (S123) from the control service (NCS) 161 to the SDK application service (SAS) 183. Then, the SDK application service (SAS) 183 generates HTML data relating to the pre-installation confirmation screen (S124). A response indicative of displaying the pre-installation confirmation screen is transmitted (S125) from the SDK application service (SAS) 183 to the control service (NCS) 161, and is then transferred (S126) from the control service (NCS) 161 to the PC 401.

Then, an action (S131) to confirm an installation is performed on the pre-installation confirmation screen, resulting in a request associated with the confirmation of an installation being transmitted (S132) from the PC 401 to the control service (NCS) 161, and being transferred (S133) from the control service (NCS) 161 to the SDK application service (SAS) 183. Then, the SDK application service (SAS) 183 performs the installation of an application (S134), followed by generating HTML data relating to the post-installation notification screen (S135). A response indicative of displaying the post-installation notification screen is transmitted (S136) from the SDK application service (SAS) 183 to the control service (NCS) 161, and is then transferred (S137) from the control service (NCS) 161 to the PC 401.

[WIM]

The above description has been given of the embodiment in which the SDK application service (SAS) 183 provides the setting screen 502. In the following, a description will be given of an embodiment in which the Web image monitor (WIM) 184 provides the setting screen 502. A description of the common features of these two embodiments will be omitted.

Figure 30:
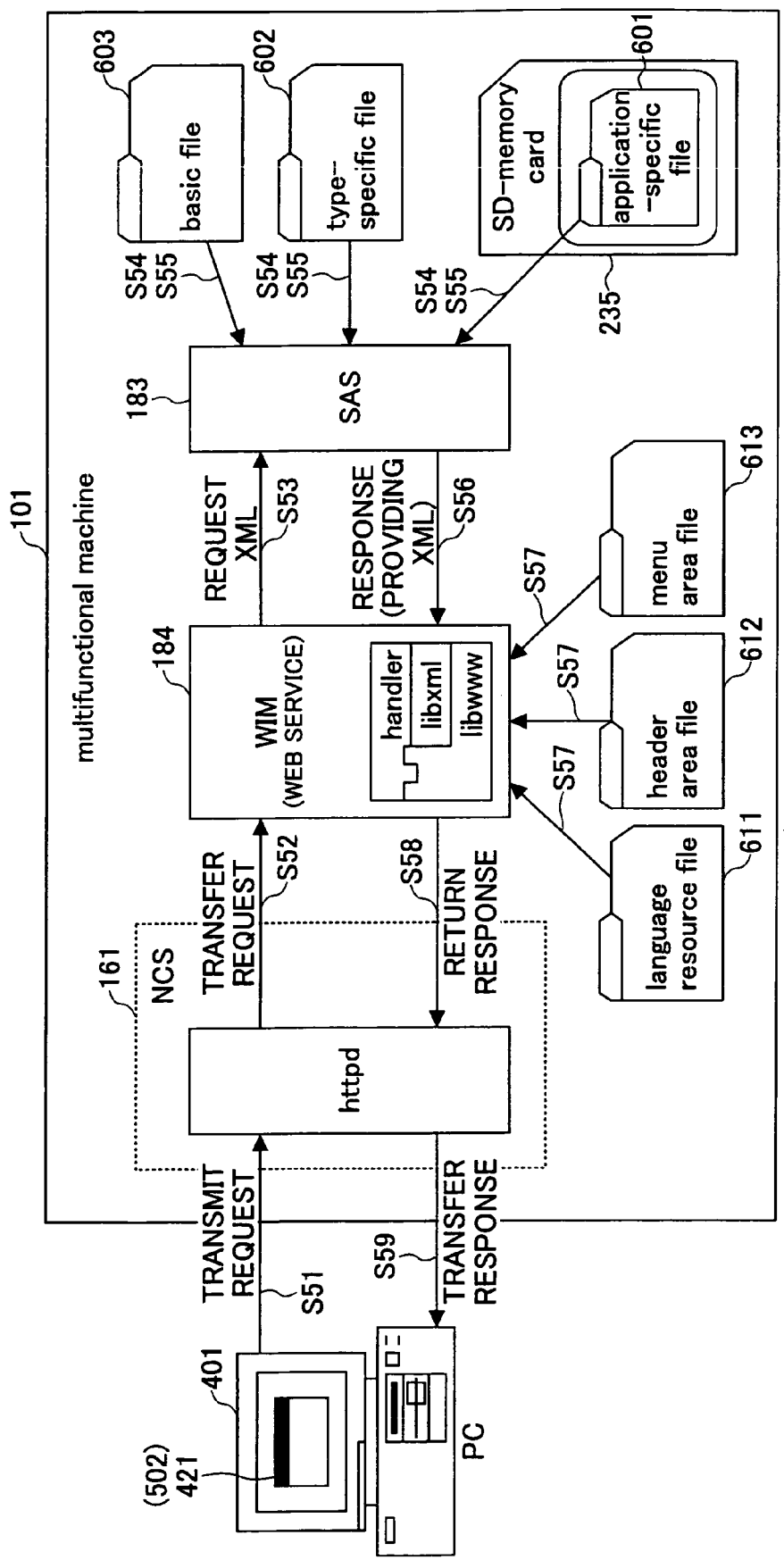
FIG. 30 is a drawing for explaining the method of providing the setting screen by a Web image monitor (WIM)

FIG. 30 is a drawing for explaining the method of providing the setting screen 502 by the Web image monitor (WIM) 184.

In order to display the setting screen 502, the Web browser 421 of the PC 401 issues a request directed to the Web service of the Web image monitor (WIM) 184 (S51). In response, the httpd of the control service (NCS) 161 transfers the request to the Web service of the Web image monitor (WIM) 184 (S52). Then, the Web image monitor (WIM) 184 requests the SDK application service (SAS) 183 to provide XML data relating to the display items of the setting screen 502 (S53). The SDK application service (SAS) 183 then acquires items to be displayed on the setting screen 502 from the item storage (S54), followed by generating XML data relating to the setting screen 502 by using the items acquired from the item storage (S55). Then, the SDK application service (SAS) 183 sends a response to the Web image monitor (WIM) 184 (S56), the response being the XML data relating to the display items of the setting screen 502. Then, the Web image monitor (WIM) 184 generates the setting screen 502 based on the XML data acquired from the SDK application service (SAS) 183 (S57). In order to display the setting screen 502, the Web service of the Web image monitor (WIM) 184 issues a response directed to the Web browser 421 of the PC 401 (S58). In response, the httpd of the control service (NCS) 161 transfers the response to the Web browser 421 of the PC 401 (S59). In this manner, the Web image monitor (WIM) 184 presents the setting screen 502 for making an installation setting to the CSDK application 146 and/or JSDK application 147.

Figure 31:
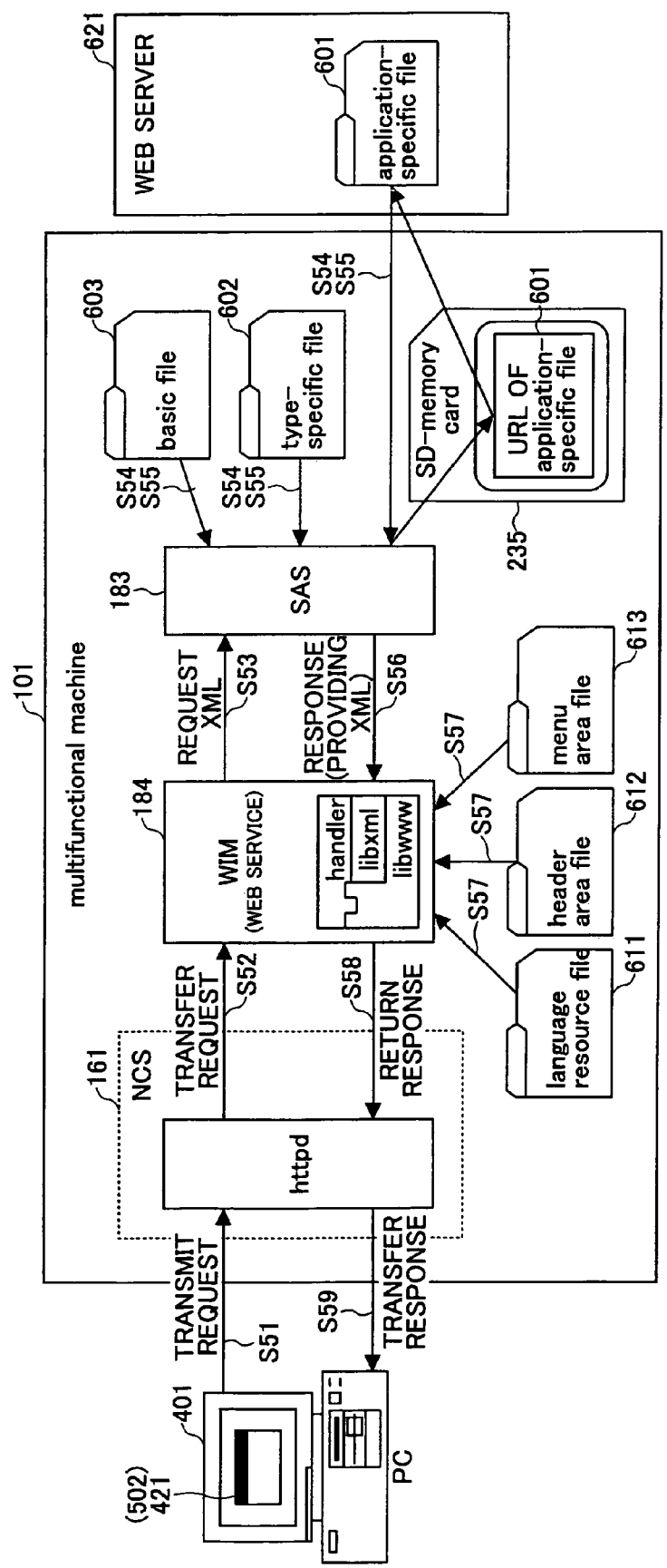
FIG. 31 is a drawing for explaining a variation of the method of providing the setting screen by a Web image monitor (WIM)

The items to be displayed on the setting screen 502 are acquired from an application-specific file 601, a type-specific file 602, and a basic file 603. The SDK application service (SAS) 183 provides the items acquired from the application-specific file 601, items acquired from the type-specific file 602, and items acquired from the basic file 603 to the Web image monitor (WIM) 184 that generates and displays the setting screen 502 based on these provided items. To be specific, the SDK application service (SAS) 183 generates the XML data relating to the items to be displayed on the setting screen 502 by using the items acquired from the application-specific file 601, items acquired from the type-specific file 602, and items acquired from the basic file 603, followed by supplying the XML data to the Web image monitor (WIM) 184, which generates the setting screen 502 based on the XML data. The contents of each item that is to be presented on the setting screen 502 in relevant language are acquired from a language resource file 611. The item that is to be displayed in the header area of the setting screen 502 is acquired from a header area file 612. The item that is to be displayed in the menu area of the setting screen 502 is acquired from a menu area file 613. The application-specific file 601, the type-specific file 602, and the basic file 603 are stored in the multi-functional machine 101 as shown in FIG. 30. The application-specific file 601 may alternatively be stored outside the multifunctional machine 101 as shown in FIG. 31.

Figure 32:
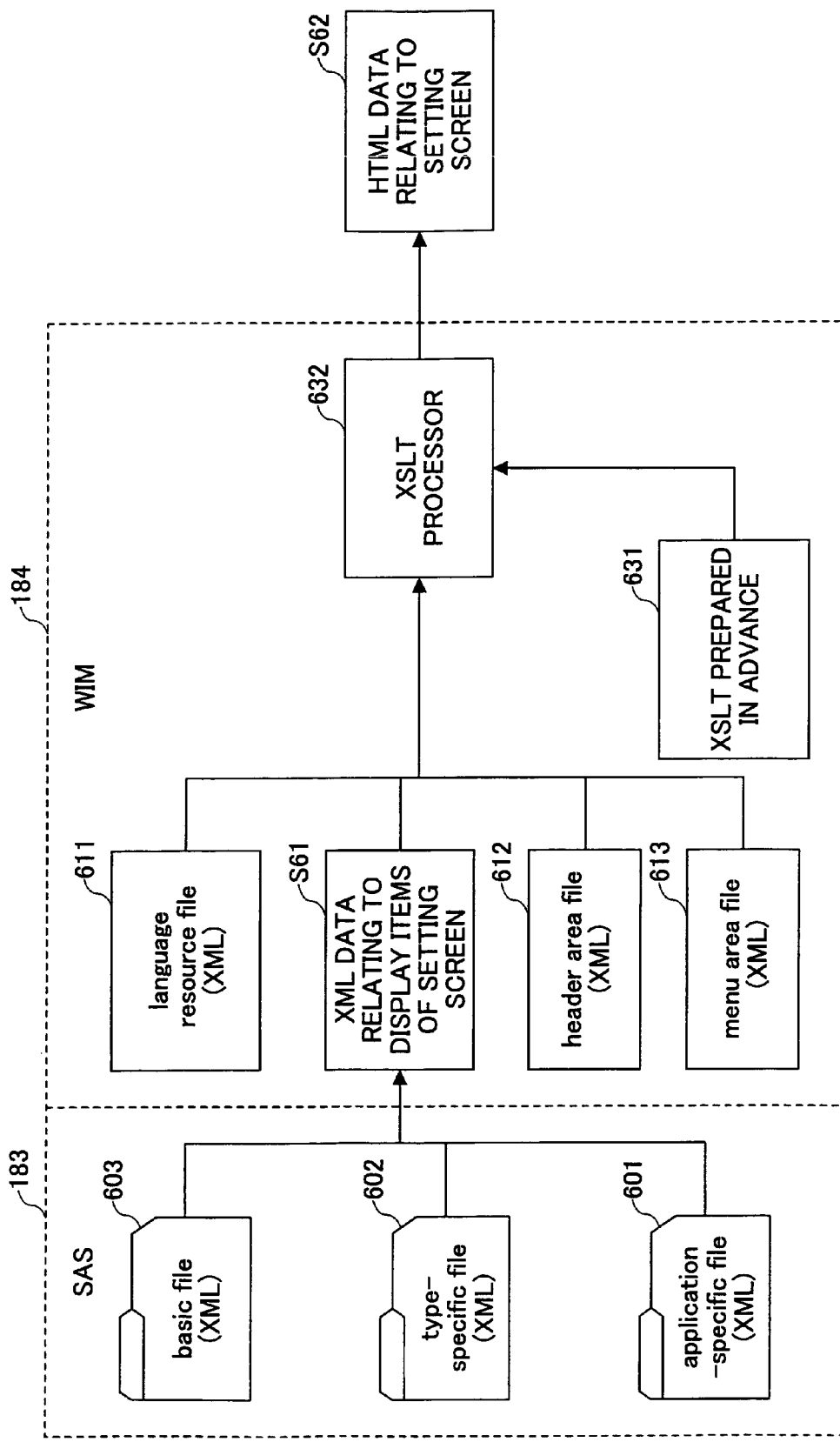
FIG. 32 is a drawing for explaining the method of generating the setting screen by the Web image monitor (WIM)

FIG. 32 is a drawing for explaining the method of generating the setting screen 502 by the Web image monitor (WIM) 184.

The items to be displayed on the setting screen 502 are stored in the application-specific file 601, type-specific file 602, and basic file 603 as descriptions using XML. Since XML can define unique tags in its own way, the items to be displayed on the setting screen 502 are described by use of these unique tags. The SDK application service (SAS) 183 generates XML data relating to the items to be displayed on the setting screen 502 by using XML data acquired from the application-specific file 601, XML data acquired from the type-specific file 602, and XML data acquired from the basic file 603, followed by supplying the XML data to the Web image monitor (WIM) 184 (S61).

It should be noted that a request (S51) from the PC 401 to the Web image monitor (WIM) 184 and a response (S58) from the Web image monitor (WIM) 184 to the PC 401 is comprised of HTML data. The Web image monitor (WIM) 184 uses an XSLT 631 that is prepared in advance, so that an XSLT processor 632 converts the XML data relating to the items to be displayed on the setting screen 502 into HTML data relating to the setting screen 502 (S62).

Figure 33:
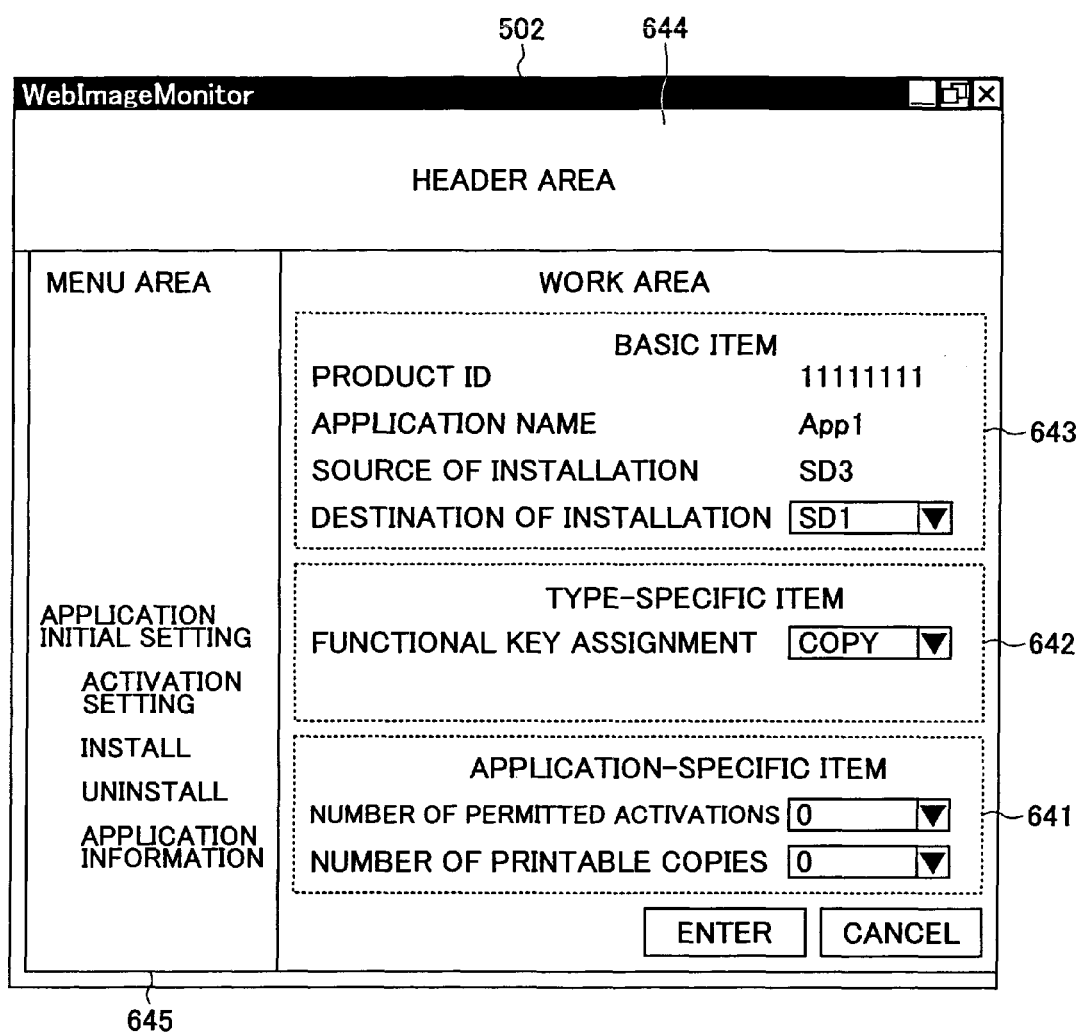
FIG. 33 is a drawing showing an example of the setting screen generated by the Web image monitor (WIM)
Figure 34:
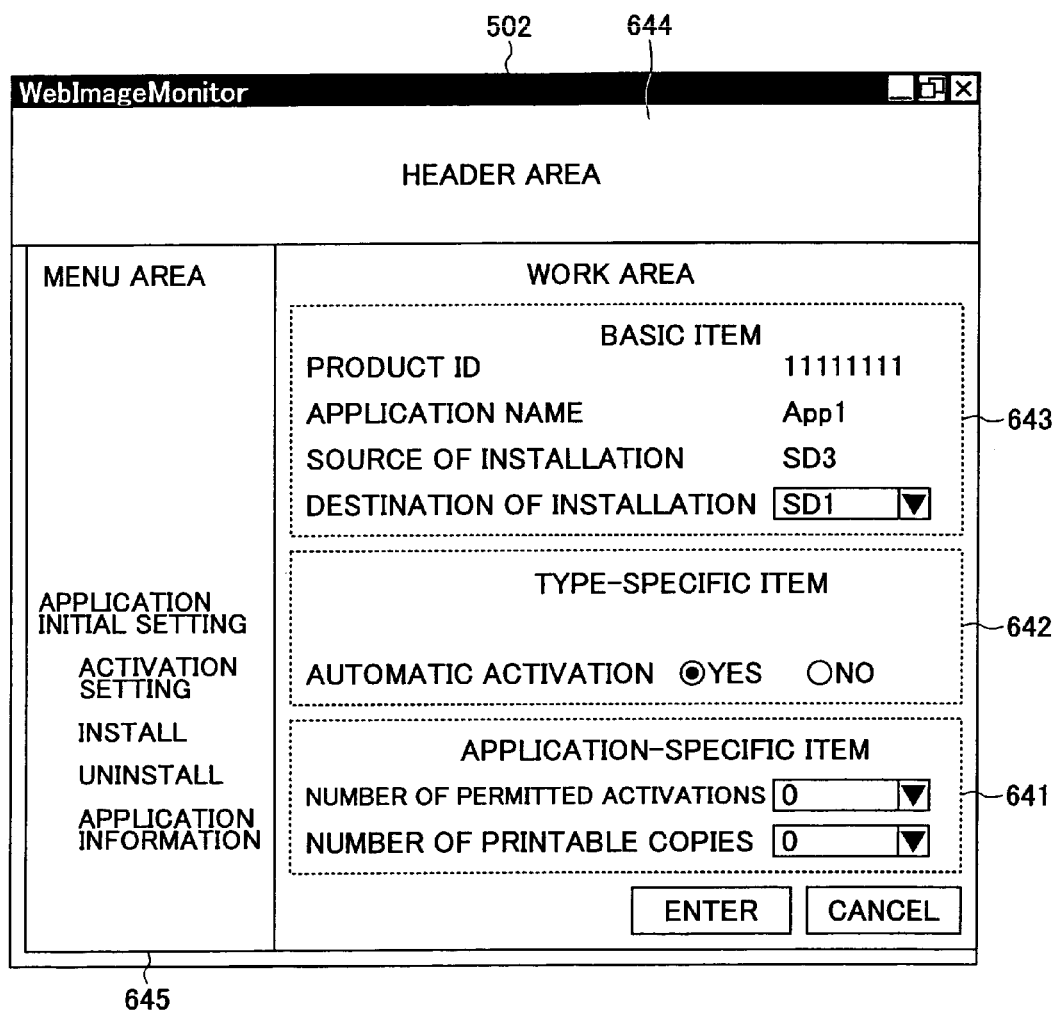
FIG. 34 is a drawing showing an example of the setting screen generated by the Web image monitor (WIM)

FIG. 33 and FIG. 34 are drawings showing examples of the setting screen 502 generated by the Web image monitor (WIM) 184. FIG. 33 shows the setting screen 502 for use for the type-1 application, and FIG. 34 shows the setting screen 502 for use for the type-2 application. Each setting screen 502 includes the application-specific area 641, the type-specific area 642, the basic area 643, a header area 644, and a menu area 645. Similarly to the examples shown in FIG. 21 and FIG. 22, the display contents of the type-specific area 642 differs between the setting screen 502 for the type-1 application and the setting screen 502 for the type-2 application.

The description provided with reference to FIG. 30, FIG. 31, FIG. 32, and FIG. 33 has been directed to the setting screen 502 for making remote settings, but may as well be applicable to the setting screen 502 for making local settings. The SDK application service (SAS) 183 provides the items acquired from the application-specific file 601, items acquired from the type-specific file 602, and items acquired from the basic file 603 to the Web image monitor (WIM) 184, which generates and displays the setting screen 502 for making local settings or the setting screen 502 for making remote settings based on these provided items.

In this manner, the Web image monitor (WIM) 184 supports the function to provide the setting screen 502, and the SDK application service (SAS) 183 supports the function to provide the items to be displayed on the setting screen 502 to the Web image monitor (WIM) 184. This implementation has an advantage in that the SDK application service (SAS) 183 does not have to provide the screen. This implementation is useful when the SDK application service (SAS) 183 does not have the function to provide the screen, for example.

FIG. 35 is a drawing showing an example of descriptions stored in the language resource file 611 (for Japanese). A description 32A shown in FIG. 35 specifies the Japanese-language expressions of the items to be displayed in the application-specific area 641. A description 32B shown in FIG. 35 specifies the Japanese-language expressions of the items to be displayed in the type-specific area 642. A description 32C shown in FIG. 35 specifies the Japanese-language expressions of the items to be displayed in the basic area 643. A description 32D shown in FIG. 35 specifies the Japanese-language expressions of the items to be displayed in the header area 644. A description 32E shown in FIG. 35 specifies the Japanese-language expressions of the items to be displayed in the menu area 645.

FIG. 36 is a drawing showing an example of descriptions stored in the language resource file 611 (for English). A description 33A shown in FIG. 36 specifies the English-language expressions of the items to be displayed in the application-specific area 641. A description 33B shown in FIG. 36 specifies the English-language expressions of the items to be displayed in the type-specific area 642. A description 33C shown in FIG. 36 specifies the English-language expressions of the items to be displayed in the basic area 643. A description 33D shown in FIG. 36 specifies the English-language expressions of the items to be displayed in the header area 644. A description 33E shown in FIG. 36 specifies the English-language expressions of the items to be displayed in the menu area 645.

FIG. 37 is a drawing showing an example of descriptions stored in the header area file 612. As shown in FIG. 37, the header area file 612 contains the descriptions of items to be displayed in the header area of the setting screen 502.

FIG. 38 is a drawing showing an example of descriptions stored in the menu area file 613. As shown in FIG. 38, the menu area file 613 contains the descriptions of items to be displayed in the menu area of the setting screen 502.

Figure 39:
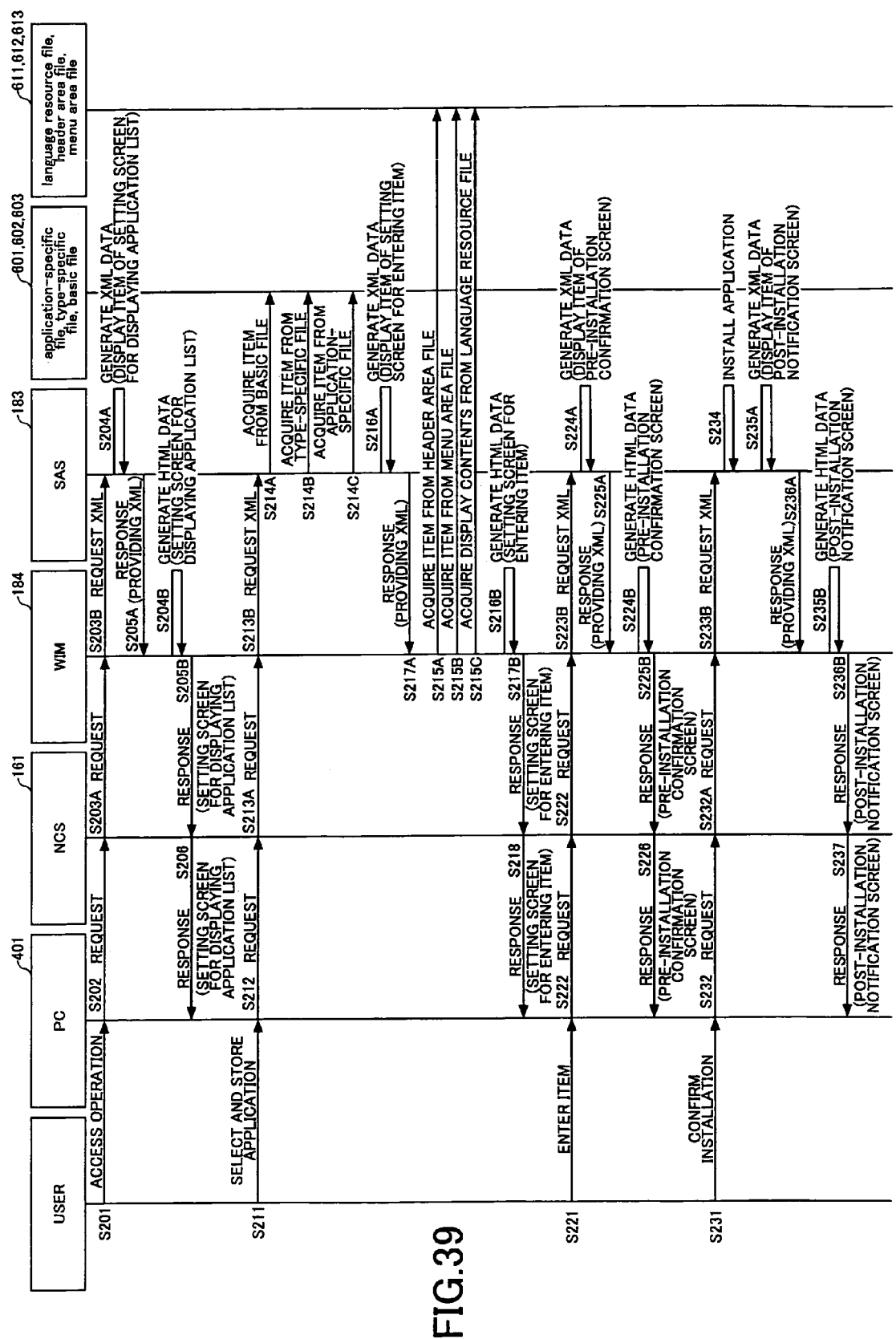
FIG. 39 is a sequence chart showing the process of providing the setting screen by the Web image monitor (WIM).

FIG. 39 is a sequence chart showing the process of providing the setting screen 502 by the Web image monitor (WIM) 184.

A user of the PC 401 performs an action (S201) to access the Web service of the Web image monitor (WIM) 184, resulting in the request to access the Web service of the Web image monitor (WIM) 184 being transmitted (S202) from the PC 401 to the control service (NCS) 161, and being transferred (S203A) from the control service (NCS) 161 to the Web image monitor (WIM) 184. Then, the Web image monitor (WIM) 184 requests the SDK application service (SAS) 183 to provide XML data relating to the display items of the setting screen 502 for displaying an application list (S203B). Then, the SDK application service (SAS) 183 generates XML data relating to the display items of the setting screen 502 for displaying an application list (S204A). Then, the SDK application service (SAS) 183 sends a response to the Web image monitor (WIM) 184, the response being the XML data relating to the display items of the setting screen 502 for displaying an application list (S205A). Then, the Web image monitor (WIM) 184 generates HTML data relating to the setting screen 502 for displaying an application list (S204B). A response indicative of displaying the setting screen 502 for displaying an application list is transmitted (S205B) from the Web image monitor (WIM) 184 to the control service (NCS) 161, and is then transferred (S206) from the control service (NCS) 161 to the PC 401.

Then, an action (S211) to select an application is performed on the setting screen 502 for displaying an application list, resulting in a request associated with the selection of an application being transmitted (S212) from the PC 401 to the control service (NCS) 161, and being transferred (S213A) from the control service (NCS) 161 to the Web image monitor (WIM) 184. Then, the Web image monitor (WIM) 184 requests the SDK application service (SAS) 183 to provide XML data relating to the display items of the setting screen 502 for entering items (S213B). The SDK application service (SAS) 183 then acquires items to be displayed on the setting screen 502 for entering items (i.e., the setting screen shown in FIG. 33) from the basic file 603, the type-specific file 602, and the application-specific file 601 (S214A, S214B, S214C). Then, the SDK application service (SAS) 183 generates XML data relating to the display items of the setting screen 502 for entering items (S216A) Then, the SDK application service (SAS) 183 sends a response to the Web image monitor (WIM) 184, the response being the XML data relating to the display items of the setting screen 502 for entering items (S217A). The Web image monitor (WIM) 184 then acquires the items to be displayed in the header area of the setting screen 502 for entering items from the header area file 612 (S215A), and acquires the items to be displayed in the menu area of the setting screen 502 for entering items from the menu area file 613 (S215B), followed by acquiring the contents of item expressions to be displayed on the setting screen 502 for entering items from the language resource file 611 (S215C). The Web image monitor (WIM) 184 generates HTML data (S216B) relating to the setting screen 502 for entering items by using the items acquired from the basic file 603, the items acquired from the type-specific file 602, the items acquired from the application-specific file 601, the items acquired from the header area file 612, the items acquired from the menu area file 613, and the display contents acquired from the language resource file 611. A response indicative of displaying the setting screen 502 for entering items is transmitted (S217B) from the Web image monitor (WIM) 184 to the control service (NCS) 161, and is then transferred (S218) from the control service (NCS) 161 to the PC 401.

Then, an action (S221) to enter an item is performed on the setting screen 502 for entering items, resulting in a request associated with the entering of an item being transmitted (S222) from the PC 401 to the control service (NCS) 161, and being transferred (S223) from the control service (NCS) 161 to the Web image monitor (WIM) 184. Then, the Web image monitor (WIM) 184 requests the SDK application service (SAS) 183 to provide XML data relating to the display items of the pre-installation confirmation screen (S223B). Then, the SDK application service (SAS) 183 generates XML data relating to the display items of the pre-installation confirmation screen (S224A). Then, the SDK application service (SAS) 183 sends a response to the Web image monitor (WIM) 184, the response being the XML data relating to the display items of the pre-installation confirmation screen (S225A). Then, the Web image monitor (WIM) 184 generates HTML data relating to the pre-installation confirmation screen (S224B). A response indicative of displaying the pre-installation confirmation screen is transmitted (S225B) from the Web image monitor (WIM) 184 to the control service (NCS) 161, and is then transferred (S226) from the control service (NCS) 161 to the PC 401.

Then, an action (S231) to confirm an installation is performed on the pre-installation confirmation screen, resulting in a request associated with the confirmation of an installation being transmitted (S232) from the PC 401 to the control service (NCS) 161, and being transferred (S233A) from the control service (NCS) 161 to the Web image monitor (WIM) 184. Then, the Web image monitor (WIM) 184 requests the SDK application service (SAS) 183 to provide XML data relating to the display items of the post-installation notification screen (S233B). Then, the SDK application service (SAS) 183 performs the installation of an application (S234), followed by generating XML data relating to the display items of the post-installation notification screen (S235A). Then, the SDK application service (SAS) 183 sends a response to the Web image monitor (WIM) 184, the response being the XML data relating to the display items of the post-installation notification screen (S236A). Then, the Web image monitor (WIM) 184 generates HTML data relating to the post-installation notification screen (S235B). A response indicative of displaying the post-installation notification screen is transmitted (S236B) from the Web image monitor (WIM) 184 to the control service (NCS) 161, and is then transferred (S237) from the control service (NCS) 161 to the PC 401.

Further, the present invention is not limited to these embodiments, but various variations and modifications may be made without departing from the scope of the present invention.

The present application is based on Japanese priority applications No. 2005-71963 filed on Mar. 14, 2005, No. 2005-

71964 filed on Mar. 14, 2005, No. 2006-044349 filed on Feb. 21, 2006, and No. 2006-044350 filed on Feb. 21, 2006, with the Japanese Patent Office, the entire contents of which are hereby incorporated by reference.

What is claimed is:

1. An image forming apparatus configured to run a plurality of applications having different activation conditions, comprising:
   a memory for storing shared information, type-specific information including items which are unique to application types, and application-specific information including items which are unique to the applications;
   an item acquiring unit configured to acquire from the memory an item to be displayed on a setting screen for making a setting to an application;
   a screen providing unit configured to generate and display the setting screen using the shared information and the type-specific information which has been acquired by the item acquiring unit, the type-specific information being a first type of settable information when there is one process for one of the applications and the type-specific information being a second type of settable information when there is one process for two or more of the applications; and
   a determination unit configured to determined the programming development type of the application so, when that programming development language is a first language, the item acquired is an item that is specific to the first language and the screen providing unit generates and displays a setting area in the setting screen that is specific to the first language,
   when the programming development language is second language, the item acquired is an item that is specific to the second language, and the screen providing unit generates and displays a setting area in the setting screen that is specific to the second language, and
   the setting area that is specific to the first language is different than the setting area that is specific to the second language,
   the screen providing unit generates the setting screen in response to an it acquired from a file that contains one or more items that are unique for each application activation condition,
   wherein the first type of settable information is a functional key assignment, and the second type of settable information is automatic activation.

2. The image forming apparatus as claimed in claim 1, wherein the item is acquired from a file and the screen providing unit is configured to obtain the file through a network.

3. The image forming apparatus as claimed in claim 1, wherein the screen providing unit is configured to generate the setting screen in response to the item acquired by the item acquiring unit to display the setting screen on a display screen of the image forming apparatus.

4. The image forming apparatus as claimed in claim 1, wherein the screen providing unit is configured to generate the setting screen in response to the item acquired by the item acquiring unit to display the setting screen as a Web page on a display screen of a terminal apparatus of the image forming apparatus.

5. The image forming apparatus as claimed in claim 1, wherein the screen providing unit is configured to generate and display the setting screen that is designed to allow a setting to be made to an application activation condition.

6. The image forming apparatus as claimed as claim 1, wherein the screen providing unit is configured to generate and display the setting screen that is designed to allow a setting to be made to an application installation condition.

7. An image forming apparatus configured to run a plurality of applications having different activation conditions, comprising:
   a memory for storing shared information, type-specific information including items which are unique to application types, and application-specific information including items which are unique to the applications;
   an item acquiring unit configured to acquire from the memory an item to be displayed on a setting screen for making a setting to an application;
   a memory for storing shared information, type-specific information including items which are unique to application types, and application-specific information including items which are unique to the applications;
   an item acquiring unit configured to acquire from the memory an item to be displayed on a setting screen for making a setting to an application;
   a screen providing unit configured to generate and display the setting screen using the shared information and the type-specific information which has been acquired by the item acquiring unit, the type-specific information being a first type of settable information when there is one process for one of the applications and the type-specific information being a second type of settable information when there is one process for two or more of the applications;
   an item providing unit configured to provide the item acquired by the item acquiring unit to a screen providing unit that generates and displays the setting screen in response to the item, wherein the item acquired is an item that is specific to a programming development language of the application; and
   a determining unit configured to determine the programming development type of the application, so that when the programming development language is a first language, the item acquired is an item that is specific to the first language, the item providing unit provides the item that is specific to the first language, and the screen providing unit generate and displays a setting area in the setting screen that is specific to the first language,
   when the programming development language is a second language, the item acquired is an item that is specific to the second language, the item providing unit provides the item that is specific to the second language, and the screen providing unit generates and displays a setting area in the setting screen that is specific to the second language, and
   the setting area that is specific to the fast language is different than the setting area that is specified to the second language,
   wherein the first time of settable information is a functional key assignment, and the second type of settable information is automatic activation.

8. The image forming apparatus as claimed in claim 7, wherein the item is acquired from a file and the item providing unit is configured to obtain the file through a network.

9. The image forming apparatus as claimed in claim 7, wherein the item providing unit is configured to provide the item acquired by the item acquiring unit to the screen providing unit that generates the setting screen in response to the provided item to display the setting screen on a display screen of the image forming apparatus.

10. The image forming apparatus as claimed in claim 7, wherein the item providing unit is configured to provide the item acquired by the item acquiring unit to the screen providing unit that generates the setting screen in response to the provided item to display the setting screen as a Web page on a display screen of a terminal apparatus of the image forming apparatus.

11. An information processing method performed by an image forming apparatus configured to run a plurality of applications having different activation conditions, comprising:

an item acquiring step of acquiring from memory an item to be displayed on a setting screen for making a setting to an application, the memory for storing shared information, type-specific information including items which are unique to the application types, and application-specific information including items which are unique to the applications;

a screen providing step of generating and displaying the setting screen for making a setting using the shared information, the type-specific information and application-specific information which has been acquired, the type-specific information being a first type of settable information when there is one process for one of the applications and the type-specific information being a second type of settable information when there is one process for two or more of the applications;

determining the programming development language type of the application, so that when the programming development language is a first language, the item acquired is an item that is specific to the first language, and the screen providing step generate and displays a setting area in the setting screen that is specific to the first language, when the programming development language is a second language, the item acquired is an item that is specific to the second language, and the semen providing step generates and displays a setting area in the setting screen that is specific to the second language, and the setting area that is specific to the first language is different than the setting area that is specified to the second language, wherein the first type of gettable information is a functional key assignment, and the second type of settable information is automatic activation.

12. The information processing method as claimed in claim 11, wherein the item is acquired from a file and the screen providing step obtains the file through a network.

13. The information processing method as claimed in claim 11, wherein the screen providing step generates the setting screen in response to the item acquired by the item acquiring step to display the setting screen on a display screen of the image forming apparatus.

14. The information processing method as claimed in claim 11, wherein the screen providing step generates the setting screen in response to the item acquired by the item acquiring step to display the setting screen as a Web page on a display screen of a terminal apparatus of the image forming apparatus.

15. A non-transitory computer-readable storage medium having a program recorded therein causing a computer to execute the information processing method as claimed in claim 11.

* * * * *